(12) United States Patent
Hasegawa

(10) Patent No.: US 8,020,248 B2
(45) Date of Patent: Sep. 20, 2011

(54) WIPER SYSTEM

(75) Inventor: Takashi Hasegawa, Hamamatsu (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 1118 days.

(21) Appl. No.: 11/819,553

(22) Filed: Jun. 28, 2007

(65) Prior Publication Data

US 2008/0005863 A1 Jan. 10, 2008

(30) Foreign Application Priority Data

Jul. 10, 2006 (JP) .................................. 2006-189381
Jul. 14, 2006 (JP) .................................. 2006-194345
Jan. 17, 2007 (JP) .................................. 2007-008520

(51) Int. Cl.
*B60S 1/34* (2006.01)
*B60S 1/28* (2006.01)

(52) U.S. Cl. ............ 15/250.351; 15/250.201; 15/250.14; 15/250.21

(58) Field of Classification Search ................ 15/250.19, 15/250.16, 250.361, 250.351, 250.17, 250.27, 15/250.3, 250.14, 250.21; 296/192, 96.15, 296/96.17

See application file for complete search history.

(56) References Cited

U.S. PATENT DOCUMENTS

| | | | | |
|---|---|---|---|---|
| 2,895,157 A * | 7/1959 | Kocourek | .................. | 15/250.19 |
| 3,083,394 A * | 4/1963 | Scinta | ........................ | 15/250.14 |
| 3,125,777 A * | 3/1964 | Leininger | .................. | 15/250.14 |
| 3,336,619 A * | 8/1967 | Hoyler | ........................ | 15/250.14 |
| 3,525,114 A * | 8/1970 | Smith | .......................... | 15/250.16 |
| 5,415,453 A * | 5/1995 | Huber | ........................ | 296/180.1 |
| 5,548,863 A * | 8/1996 | Deng | .......................... | 15/250.16 |
| 6,038,728 A | 3/2000 | Terai et al. | | |
| 6,453,505 B1 | 9/2002 | Terai | | |
| 7,355,360 B2 | 4/2008 | Assan | | |
| 2003/0052504 A1 * | 3/2003 | Knauf et al. | ................ | 296/96.15 |

FOREIGN PATENT DOCUMENTS

| | | |
|---|---|---|
| JP | U-62-185665 | 11/1987 |
| JP | B2-2888651 | 2/1999 |
| JP | A-11-348733 | 12/1999 |

OTHER PUBLICATIONS

OA dated Jun. 10, 2010 issued in the corresponding CN application No. 200710127970.8.
OA mailed on Jul. 6, 2010 in the corresponding JP application No. 2006-189381.

* cited by examiner

*Primary Examiner* — Gary Graham
(74) *Attorney, Agent, or Firm* — Posz Law Group, PLC

(57) ABSTRACT

Wiper blades are connected to wiper arms, respectively, to wipe a wiping surface of a vehicle front window glass. One of the wiper arms includes a cover portion, which at least partially covers at least one of the other wiper arm and the wiper blade connected thereto to continuously arrange the wiper arms one after the other along a lower edge of the wiping surface when each of the wiper blades is placed in a corresponding storage position thereof.

4 Claims, 18 Drawing Sheets

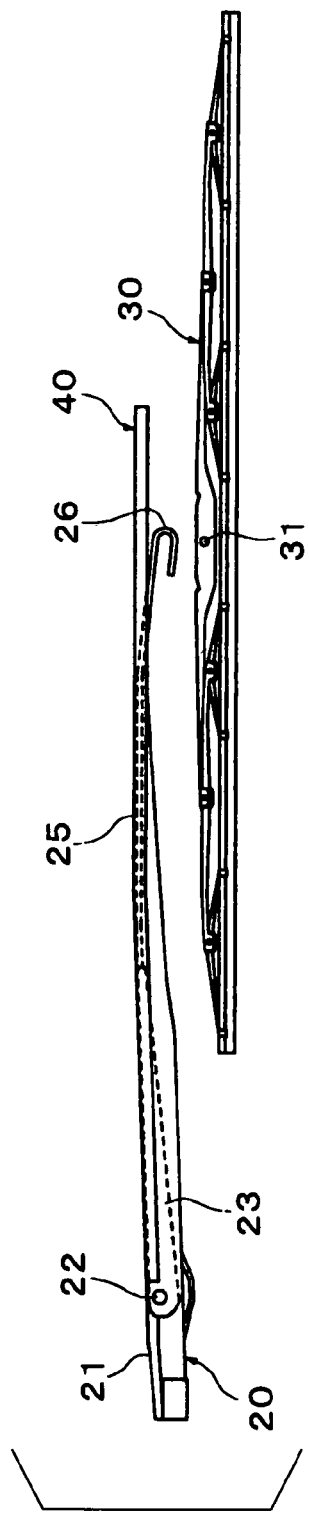
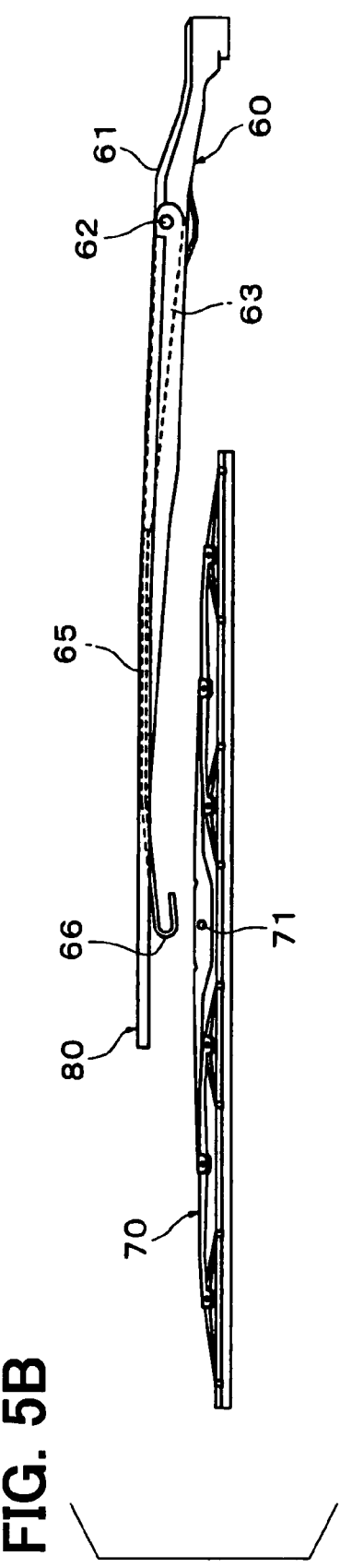
FIG. 5A
FIG. 5B

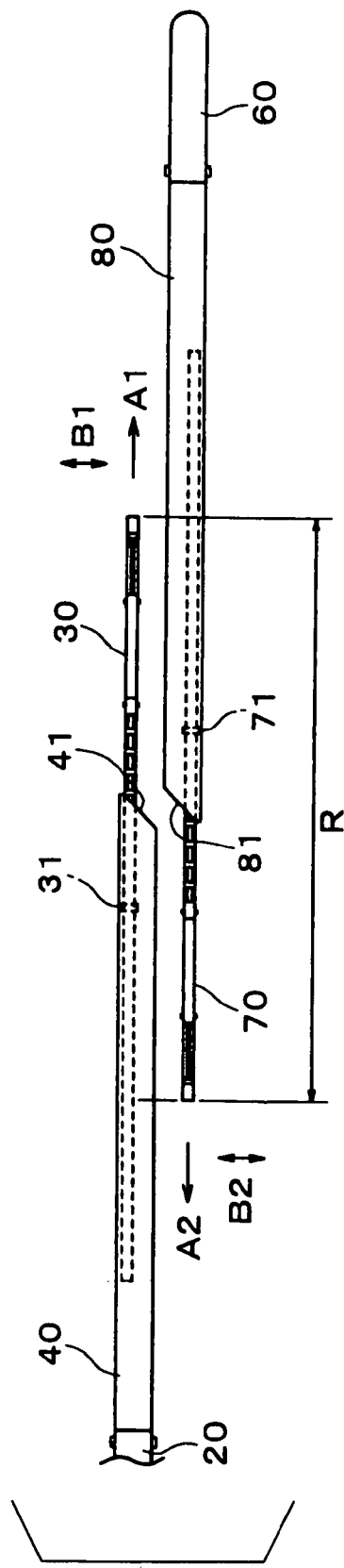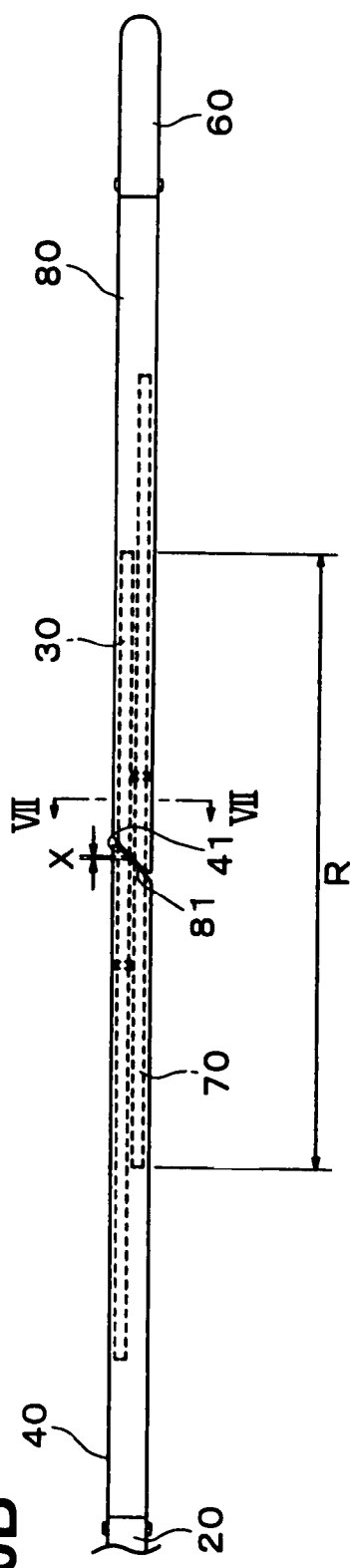

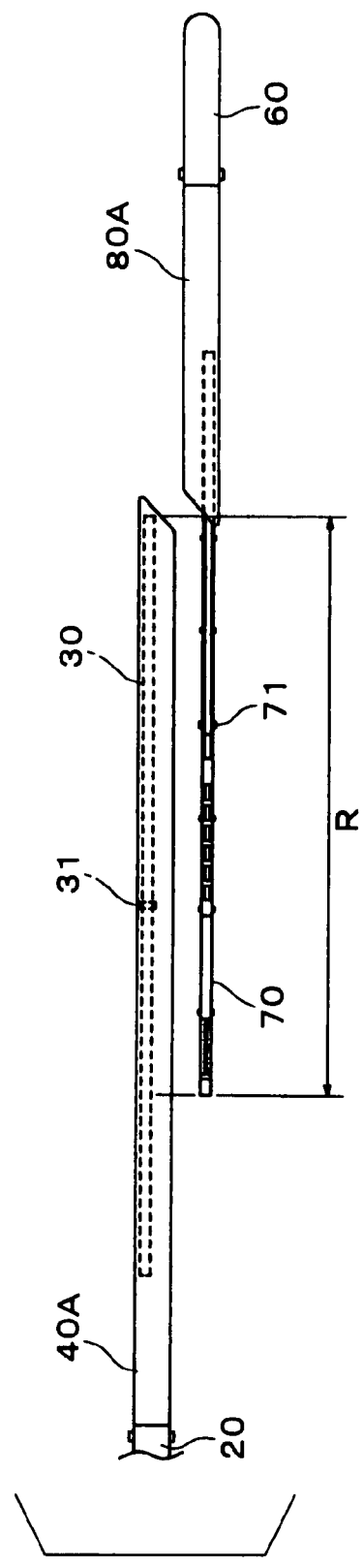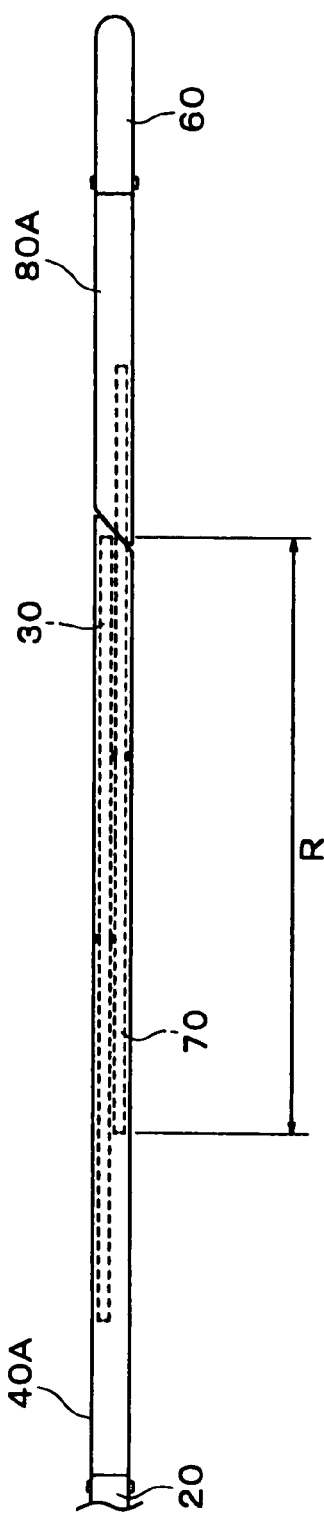
FIG. 10A
FIG. 10B

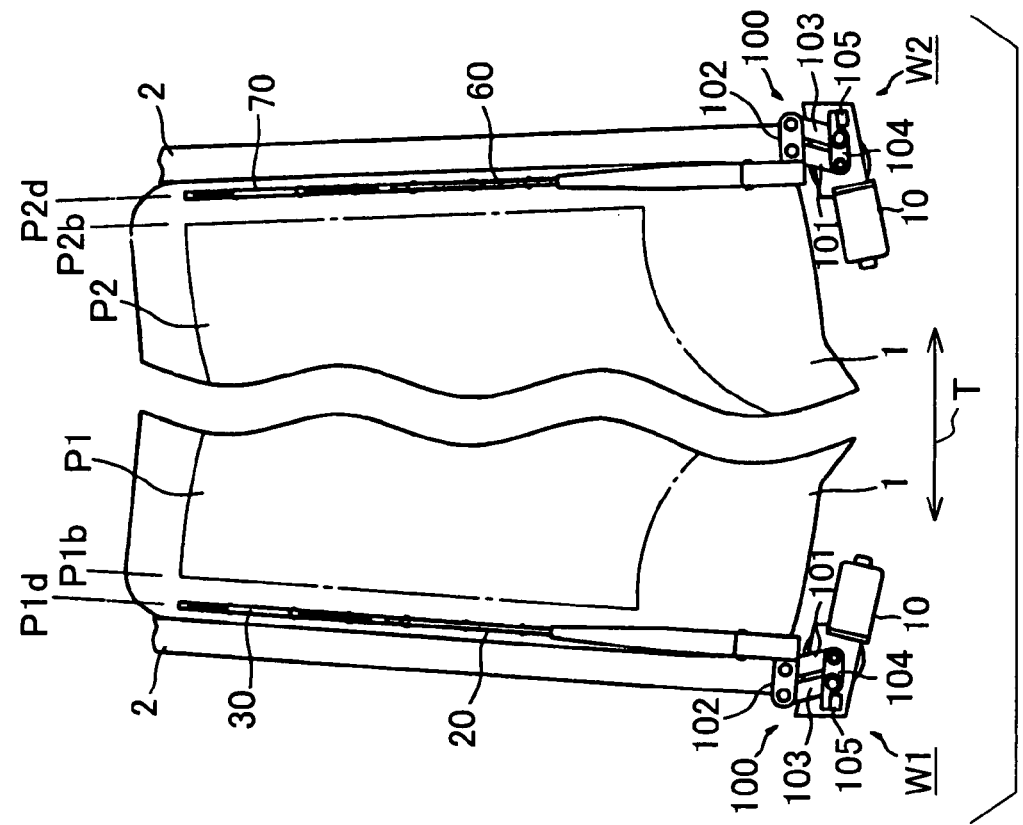
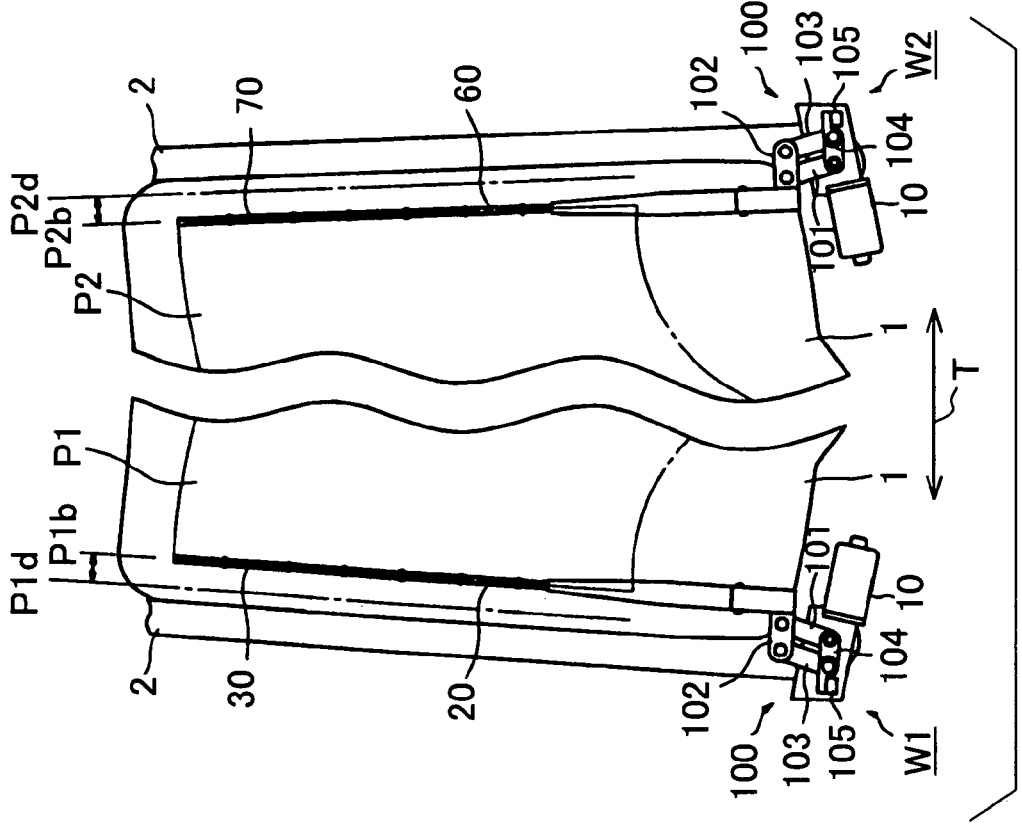

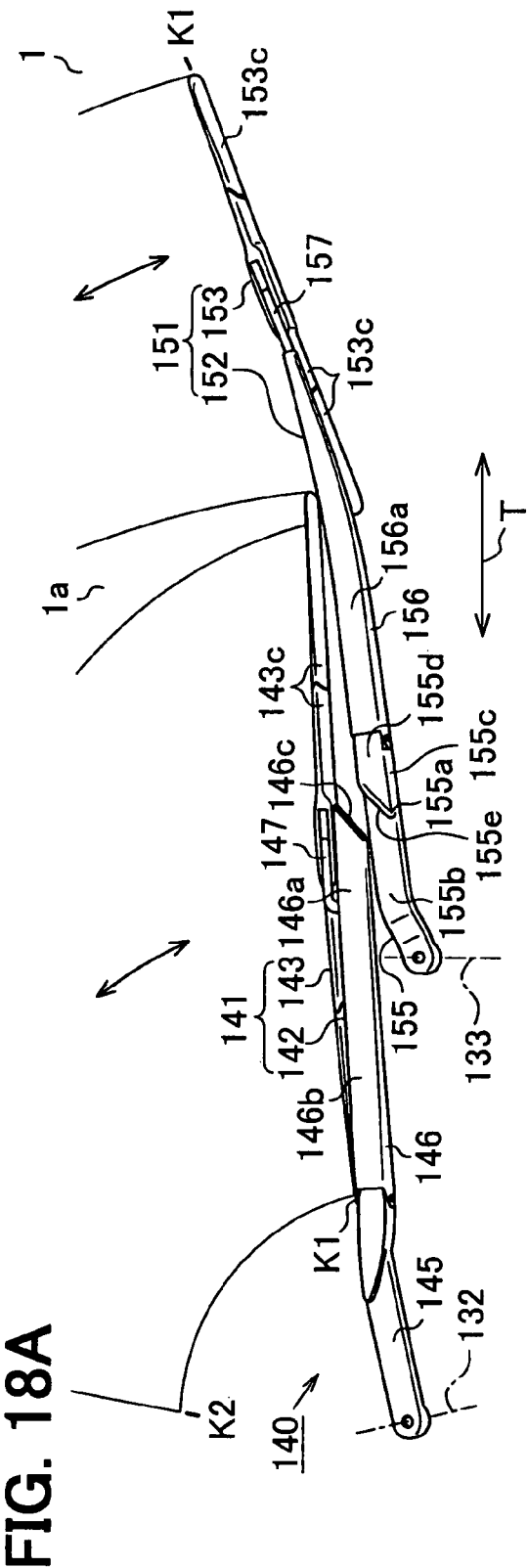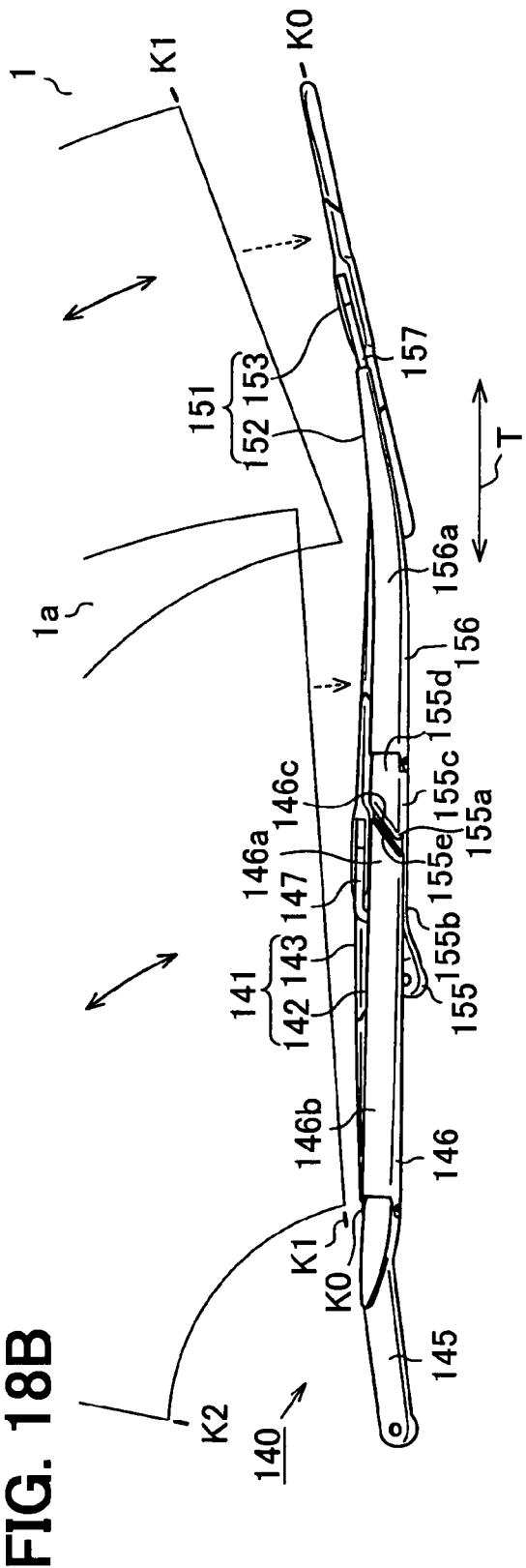

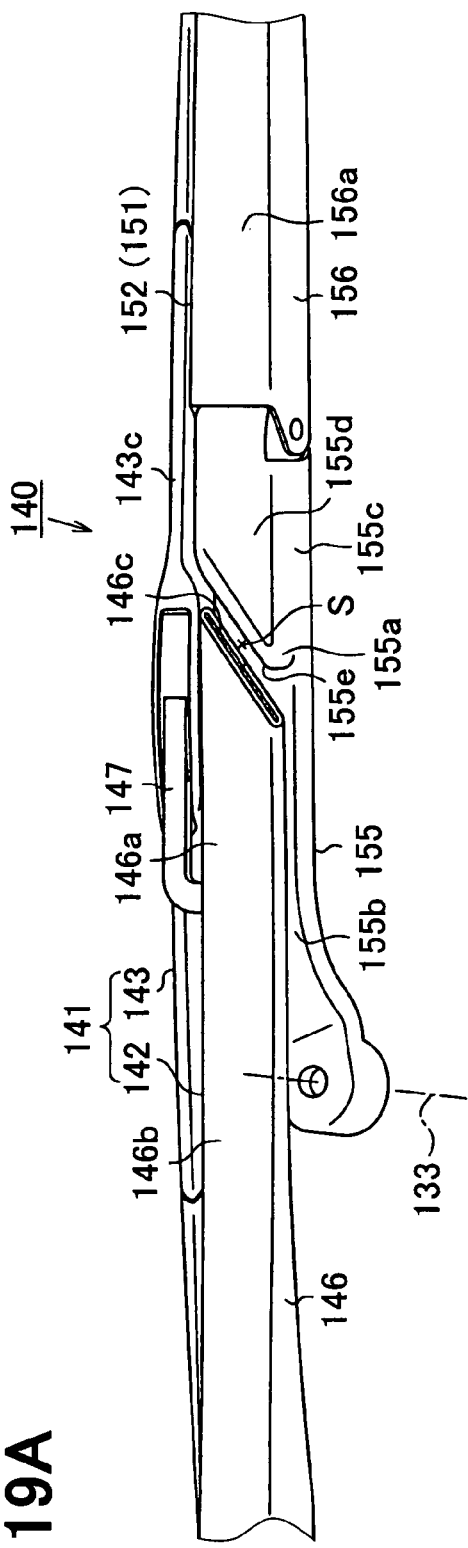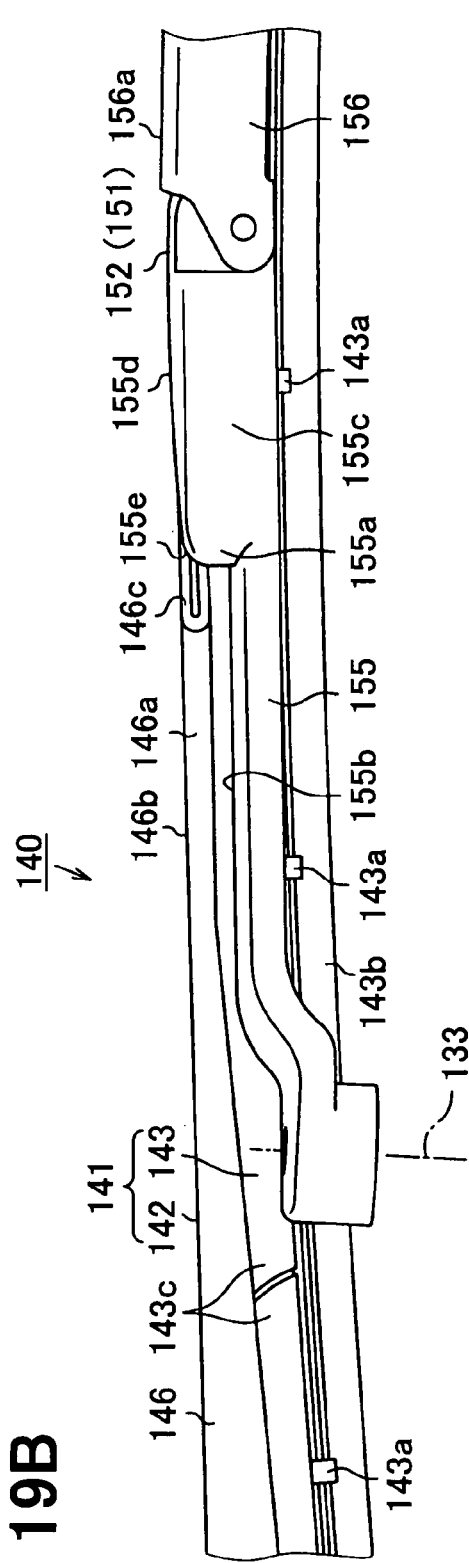

WIPER SYSTEM

CROSS REFERENCE TO RELATED APPLICATION

This application is based on and incorporates herein by reference Japanese Patent Application No. 2006-189381 filed on Jul. 10, 2006, Japanese Patent Application No. 2006-194345 filed on Jul. 14, 2006 and Japanese Patent Application No. 2007-8520 filed on Jan. 17, 2007.

BACKGROUND OF THE INVENTION

1. Field of the Invention

The present invention relates to a wiper system.

2. Description of Related Art

In a known type of wiper system, two wiper blades reciprocally wipe a wiping surface of, for example, a front window glass of a vehicle. When each of the wiper blades are placed at a swing movement turning position (hereinafter, simple referred to as "turning position") thereof, the wiper blades are arranged parallel to each other such that overlapping portions of the wiper blades are overlapped with each other to form an overlapped section. Particularly, in a case of an opposed pattern wiper system, two wiper arms (more specifically the wiper arms and wiper blades connected thereto) are reciprocally swung in opposite directions, respectively, to wipe the wiping surface. Thus, at one turning position, the wiper blades are arranged parallel to each other and form the longitudinally overlapped section.

When the above wiper system is arranged at a lower part of the front window glass of the vehicle, the overlapping portions of the two wiper blades are overlapped with each other to form an overlapped section at a lower turning position. When the two wiper blades are constructed to form the overlapped section at the lower turning position, the wiper blades may possibly interfere with each other at the time of starting the wiping movement or at the time of turning at the lower turning position. In order to limit the interferences, a space needs to be provided between the wiper blades at the lower turning position. This may possibly deteriorate the appearance of the vehicle at the time of stopping the wiping movement or at the time of performing the wiping.

In order to address the above disadvantage, Japanese Patent No. 2888651 proposes the opposed pattern wiper system, which makes turning of one of two wiper blades at a location that is upwardly spaced a predetermined distance from a lower turning position of the other one of the wiper blades. Then, at the time of stopping the wiper blades, the one of the wiper blades is pivoted to a stop position, which is placed around the lower turning position of the other one of the wiper blades.

That is, the stop position of the one of the wiper blades is located below its turning position. At the time of stopping the wiping movement, only the one of the wiper blades is further pivoted downward to store it in close proximity to the other one of the wiper blades. In this way, appearance of this wiper system at the time of stopping its wiping movement is improved.

Furthermore, in the above wiper system, at the time of staring the wiping movement, the one of the wiper blades, which is located above the other one of the wiper blades, is moved from the stop position to the lower turning position while the other one of the wiper blades is still held in the lower turning position. In this way, the substantial space is provided between the wiper blades in the wiping direction, and thereafter, the wiping movement of the wiper blades is started. In this way, even when the overlapped section is formed in the turning position or the stop position, the wiping movement of the wiper blades can be started without causing substantial interferences therebetween.

However, in the case of the wiper system, which is disclosed in Japanese Patent No. 2888651, although the two wiper blades are placed close to each other at the time of stopping the wiping movement, the wiper blades are still arranged one after the other in a width direction of the wiper blades to form the overlapped section. Thus, the wiper arms (the wiper arms and the blades) are still conspicuous, and an improvement in terms of appearance is still required.

Furthermore, Japanese Unexamined Patent Publication No. H11-43019 (corresponding to U.S. Pat. No. 6,038,728) discloses a wiper system of a tandem type that wipes a front window glass of a vehicle and includes two wipers, each of which has a common wiping direction. In general, in such a wiper system of the tandem type, a wiper blade of each wiper is stopped at a lower turning position (a position at which the wiper blade is placed to extend generally parallel to a transverse direction of the vehicle) of its reciprocal wiping movement or is stopped at a storage position, which is separately set at a lower part of the front window glass, which is below the lower turning position.

However, in the stopped state of the above wiper system, the wipers can be clearly recognizable as separate wipers, so that the wipers provide a nonintegrated impression of the wipers and are conspicuous. Therefore, appearance of the part of vehicle, at which the wipers are placed, is deteriorated.

SUMMARY OF THE INVENTION

The present invention addresses the above disadvantages. Thus, it is an objective of the present invention to provide a wiper system, which provides improved appearance of wiper blades at the time of stopping wiping movement thereof.

To achieve the objective of the present invention, there is provided a wiper system, which includes first and second wiper arms and first and second wiper blades. The first and second wiper blades are connected to the first and second wiper arms, respectively, to wipe a wiping surface. The first wiper arm includes a cover portion, which at least partially covers at least one of the second wiper arm and the second wiper blade to continuously arrange the first and the second wiper arms one after the other along the lower edge of the wiping surface when each of the first and second wiper blades is placed in a corresponding stop position thereof.

To achieve the objective of the present invention, there is also provided a wiper system, which includes first and second wiper arms, first and second wiper blades and at least one moving mechanism. The first and second wiper arms are connected to first and second pivot shafts, respectively, and are reciprocally swung in opposite directions, respectively. The first and second wiper blades are connected to distal end portions of the first and second wiper arms, respectively, to reciprocally wipe a wiping surface. The at least one moving mechanism drives at least one of the first and second wiper arms to make a generally translational movement of the at least one of the first and second wiper arms to move the corresponding wiper blade connected thereto between a swing movement turning position of the corresponding wiper blade and a stop position of the corresponding wiper blade. The stop position of the corresponding wiper blade is outward of the turning position of the corresponding wiper blade and is thereby spaced away from a wiping range of the corresponding wiper blade.

BRIEF DESCRIPTION OF THE DRAWINGS

The invention, together with additional objectives, features and advantages thereof, will be best understood from the following description, the appended claims and the accompanying drawings in which:

FIG. 5A is a descriptive diagram showing a wiper arm, the wiper blade and a cover of one of two wiper mechanisms of the wiper system shown in FIG. 1;

FIG. 5B is a descriptive diagram showing a wiper arm, the wiper blade and a cover of the other one of the wiper mechanisms of the wiper system shown in FIG. 1;

FIG. 6A is a descriptive diagram showing the wiper arms, the wiper blades and the covers in the lower turning position according to the first embodiment;

FIG. 6B is a descriptive diagram showing the wiper arms, the wiper blades and the covers in the storage position according to the first embodiment;

FIG. 10A is a descriptive diagram showing a modification of the wiper system of the first embodiment;

FIG. 10B is a descriptive diagram showing the modification of the wiper system of FIG. 10A placed in a storage position;

FIG. 17A is a descriptive diagram showing a wiper system of a fourth embodiment, in which wiper blades are respectively held in an upper turning position thereof;

FIG. 17B is a descriptive diagram showing the wiper system of FIG. 17A, in which the wiper blades are respectively held in a storage position thereof;

FIG. 18A is a schematic diagram showing a wiper system of a fifth embodiment, in which wiper blades are respectively held in a lower turning position thereof;

FIG. 18B is a schematic diagram showing the wiper system of FIG. 18A, in which the wiper blades are respectively held in its storage position;

FIG. 19A is an enlarged partial top view showing an overlapped section, at which the wipers are overlapped with each other in its storage position; and FIG. 19B is an enlarged partial side view showing the overlapped section of FIG. 19A from its lateral side.

DETAILED DESCRIPTION OF THE INVENTION

First Embodiment

A first embodiment of the present invention will be described with reference to FIGS. 1 to 9C.

Figure 1:
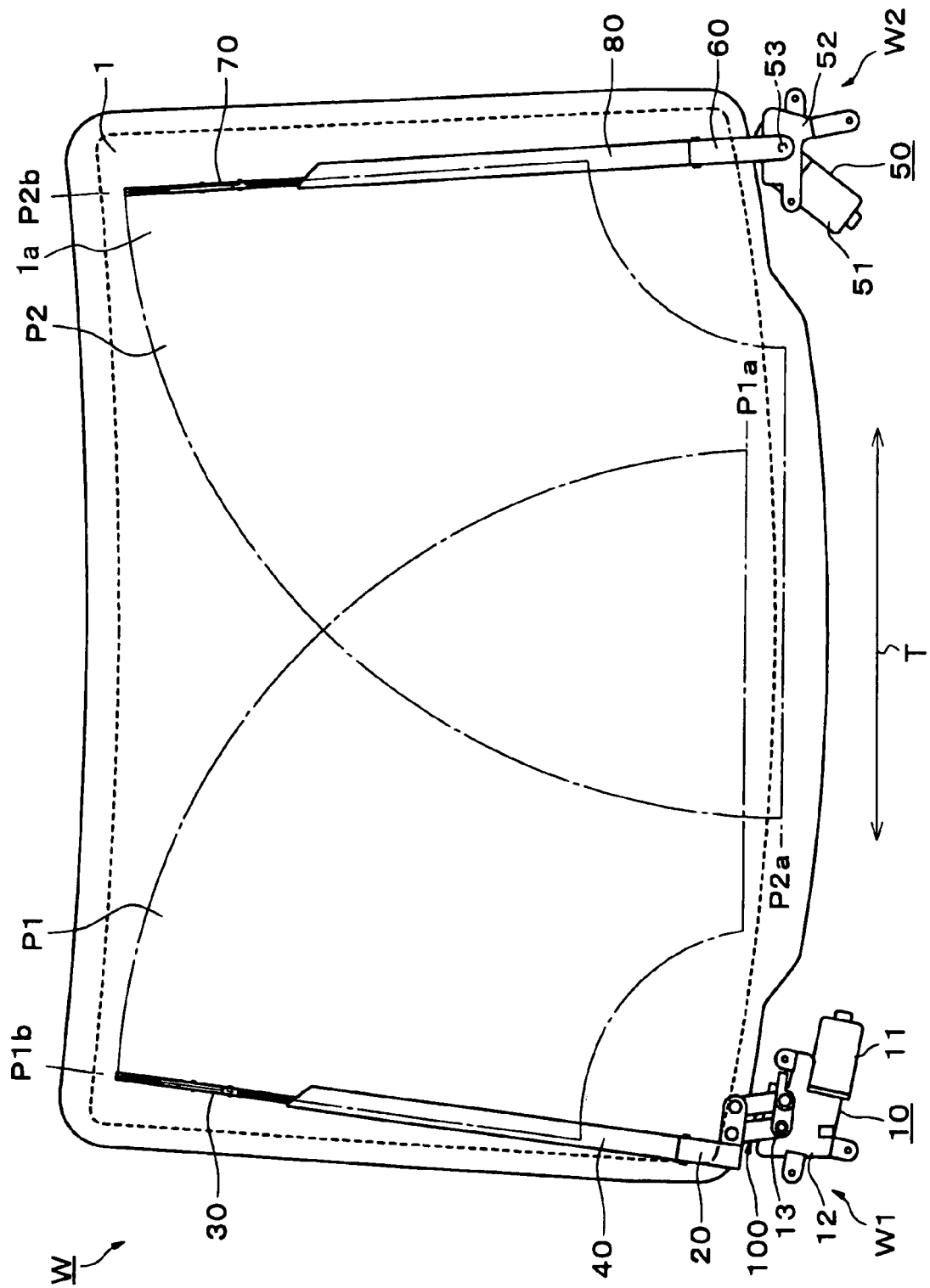
FIG. 1 is a schematic diagram showing a wiper system of a first embodiment of the present invention, in which wiper blades are respectively held in a corresponding upper turning position thereof.
Figure 2:
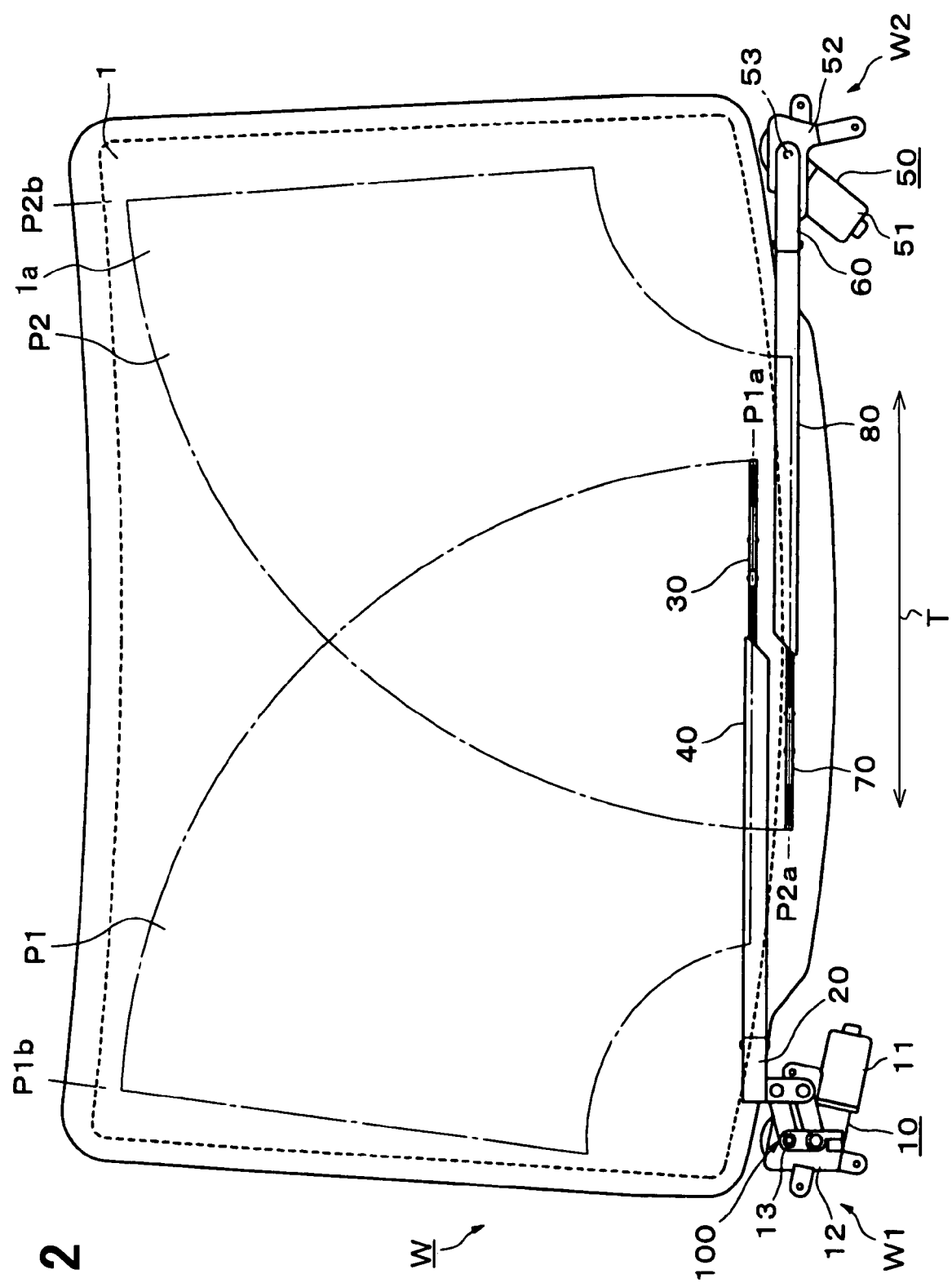
FIG. 2 is a schematic diagram showing the wiper system of FIG. 1, in which the wiper blades are respectively held in a lower turning position thereof.
Figure 3:
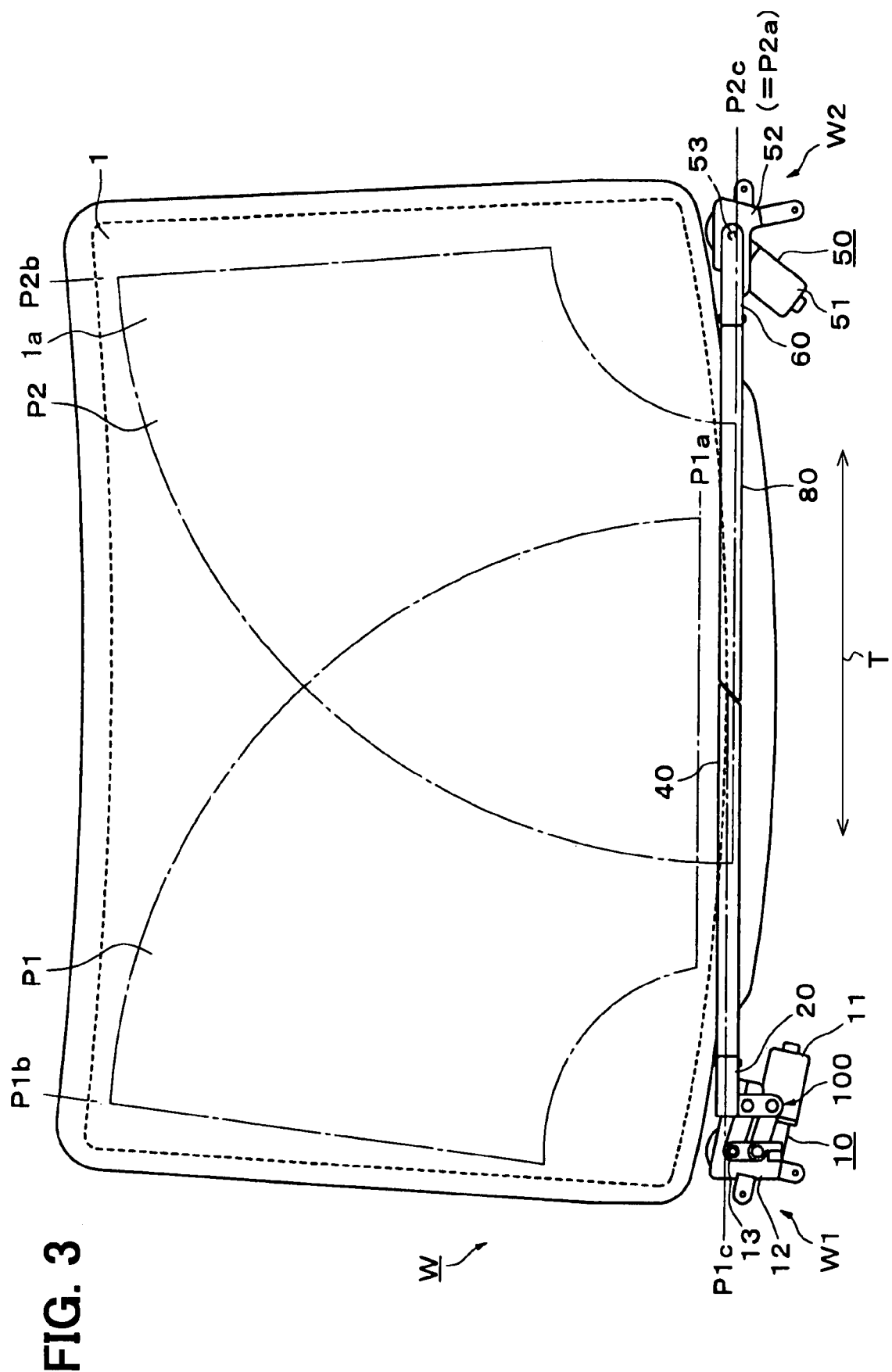
FIG. 3 is a schematic diagram showing the wiper system of FIGS. 1 and 2, in which the wiper blades are respectively held in a storage position thereof.

As shown in FIGS. 1 to 3, a wiper system W of the present invention is an opposed pattern wiper system for reciprocally wiping a wiping surface 1a of a front window glass 1 (hereinafter, simply referred to as "glass 1") of a vehicle and includes two wiper mechanisms W1, W2. The wiper mechanisms W1, W2 are arranged one after another in a transverse direction of the vehicle, which is indicated by a double-sided arrow T in FIGS. 1 to 3.

The wiper mechanism W1 includes a wiper motor 10, a wiper arm 20, a wiper blade 30 and a cover (also referred to as a cover portion) 40. The wiper motor 10 is installed at a right lower corner of the glass 1, which is configured into a generally rectangular shape. The wiper arm 20 is fixed to a base end portion of the wiper motor 10. The wiper blade 30 is rotatably connected to a distal end portion of the wiper arm 20. The cover 40 covers a top surface side (a side opposite from the wiping surface) of the wiper arm 20 and a top surface side of the wiper blade 30.

The wiper mechanism W2 includes a wiper motor 50, a wiper arm 60, a wiper blade 70 and a cover (also referred to as a cover portion) 80. The wiper motor 50 is installed at a left lower corner of the glass 1. The wiper arm 60 is fixed to a base end portion of the wiper motor 50. The wiper blade 70 is rotatably connected to a distal end portion of the wiper arm 60. The cover 80 covers a top surface side (a side opposite from the wiping surface) of the wiper arm 60 and a top surface side of the wiper blade 70.

The wiper mechanisms W1, W2 are constructed to wipe wiping ranges P1, P2 of FIG. 1 with the wiper blades 30, 70, respectively. The wiping range P1 has a generally fan shape, which is circumferentially defined between a lower swing movement turning position (hereinafter, simply referred to as "lower turning position") P1a and an upper swing movement turning position (hereinafter, simply referred to as "upper turning position") P1b. The wiping range P2 has a generally fan shape, which is circumferentially defined between a lower turning position P2a and an upper turning position P2b. FIG. 1 shows one state where the wiper mechanisms W1, W2 are driven to the upper turning positions P1b, P2b, respectively. FIG. 2 shows another state where the wiper mechanisms W1, W2 are driven to the lower turning positions P1a, P2a, respectively.

Since the wiper system W of the present embodiment is the opposed pattern wiper system, a rotational direction of the wiper arm 20 from the lower turning position P1a to the upper turning position P1b is opposite from a rotational direction of the wiper arm 60 from the lower turning position P2a to the upper turning position P2b.

In the present embodiment, the lower turning position P1a is placed above the lower turning position P2a in a vehicle height direction (in a vertical direction). When the wiper arms 20, 60 are turned at a location near a lower edge of the glass 1, the wiper arm 20 is placed at an upper side (a wiping range inner side), and the wiper arm 60 is placed at a lower side (a wiping range outer side or a wiping surface edge side). Thus, in an area around the lower turning position P1a, P2a, at the time of moving from the lower turning position P1a, P2a to the upper turning position P1b, P2b, the wiper blade 30 is ahead of the wiper blade 70. In contrast, in the same area around the lower turning position P1a, P2a, at the time of moving from the upper turning position P1b, P2b to the lower turning position P1a, P2a, the wiper blade 70 is ahead of the wiper blade 30.

As described above, according to the present embodiment, the lower turning position P1a is displaced from the lower turning position P2a by a predetermined space in the wiping direction. Thus, at the time of reciprocal wiping movement, it is possible to limit interferences between the wiper blade 30 and the wiper blade 70 even if wiping timing deviates due to application of an external load to the wiper mechanisms W1, W2.

FIG. 3 shows a state where the wiper system W is placed in a storage position (stop position). In the case of the wiper mechanism W2 of the present embodiment, the lower turning position P2a is the storage position (stop position) P2c (=p2a). In the case of the wiper mechanism W1, the storage position (stop position) P1c is located below the lower turning position P1a on the lower outer side of the wiping range P1. Although the storage position P1c is located slightly above the storage position P2c generally by an amount of a width of the wiper blade 30 but generally coincides with the storage position P2c. Thus, as will be described latter, in the storage state (stop state), the wiper blades 30, 70 have a longitudinally overlapped part R (a section, in which overlapping portions of the wiper blades 30, 70 are overlapped with each other along a longitudinal direction thereof) and are arranged generally in parallel to each other in a width direction thereof, which is a top to bottom direction in FIGS. 6A and 6B. The wiper mechanism W1 includes a moving mechanism 100, as will be described latter. The moving mechanism 100 is a mechanism that makes a generally translational movement of the wiper arm 20 and the wiper blade 30 connected thereto between the storage position P1c and the lower turning position P1a.

The wiper motor 10 of the present embodiment includes a motor unit 11 and a gear unit 12. The motor unit 11 includes a direct current electric motor. The gear unit 12 reduces a rotational speed of an output of the motor unit 11 and transmits the reduced rotational speed to a pivot shaft 13. The pivot shaft 13 may form an output shaft of the wiper motor 10 or may be provided separately from the output shaft of the wiper motor 10. The wiper motor 50 includes a motor unit 51 and a gear unit 52. The motor unit 51 includes a direct current electric motor. The gear unit 52 reduces a rotational speed of an output of the motor unit 51 and transmits the reduced rotational speed to a pivot shaft 53. The pivot shaft 53 may form an output shaft of the wiper motor 50 or may be provided separately from the output shaft of the wiper motor 50.

Figure 4:
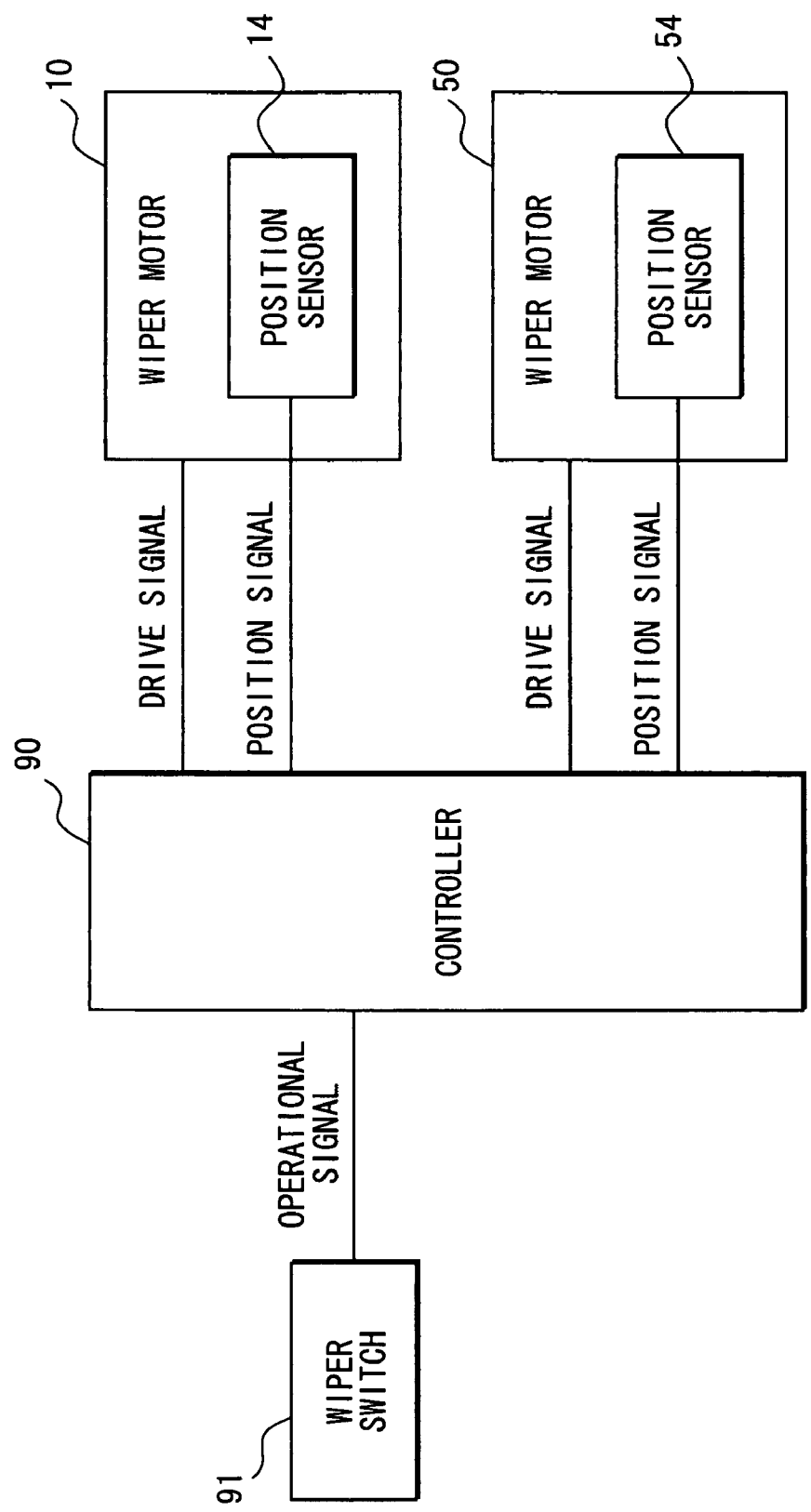
FIG. 4 is an electrical structural diagram of the wiper system shown in FIG. 1.

As shown in FIG. 4, the wiper motors 10, 50 are constructed to operate independently based on a drive signal received from a controller 90. The controller 90 is connected to a wiper switch 91 and position sensors 14, 15, which are arranged in the motor units 11, 51, respectively. Each position sensor 14, 15 is formed as a magnet sensor provided to an armature of the corresponding motor unit 11, 51 and transmits a position signal (a pulse signal) to the controller 90 according to the rotation of the armature. The controller 90 counts this pulse signal to sense the rotational speed of the armature and a rotational angle of the respective pivot shafts 13, 53 (i.e., of the respective wiper arms 20, 60).

When the controller 90 receives an operational signal from the wiper switch 91, the controller 90 synchronously controls the wiper motors 10, 50. That is, the controller 90 outputs the drive signals to the wiper motors 10, 50 to rotate the wiper motors in a forward rotational direction and a backward rotational direction and thereby to reciprocally rotate the pivot shafts 13, 53, so that the wiper arms 20, 60 are reciprocally swung at its corresponding rotational speed within the corresponding wiping range.

In the present embodiment, the wiper motor 10 is connected to the wiper arm 20 through the moving mechanism 100. In contrast, the pivot shaft 53 of the wiper motor 50 is directly connected to the base end portion of the wiper arm 60.

As shown in FIG. 5A, the wiper arm 20 of the present embodiment includes an arm head 21, a retainer 23 and an arm piece 25. The retainer 23 is rotatably connected to the arm head 21 through a connecting pin 22. The arm piece 25 is fixed to a distal end portion of the retainer 23. As shown in FIG. 5B, the wiper arm 60 of the present embodiment includes an arm head 61, a retainer 63 and an arm piece 65. The retainer 63 is rotatably connected to the arm head 61 through a connecting pin 62. The arm piece 65 is fixed to a distal end portion of the retainer 63.

Each wiper blade 30, 70 is a tournament type wiper blade. A hook 26, 66, which is formed in a distal end portion of the arm piece 25, 65, is engaged with a coupling device (not shown) installed to the connecting pin 31, 71, so that the wiper blade 30, 70 is rotatably connected to the wiper arm 20, 60.

Next, the covers 40, 80 will be described.

The cover 40 of the present embodiment partially covers a top surface of the wiper arm 20 and a top surface of the wiper blade 30. The cover 80 partially covers a top surface of the wiper arm 60 and a top surface of the wiper blade 70. Here, the top surface refers to a surface (surface opposite from the wiping surface), which is opposite from a glass side surface that is opposed to the glass 1. In the present embodiment, the cover 40, 80 extends integrally from the distal portion of the retainer 23, 63, which has a generally shoe shaped cross section that has a lower opening. A height of the cover 40, 80 decreases toward its distal end side. The cover 40, 80 covers the top surfaces of the wiper arm 20, 60 and of the wiper blade 30, 70 while receiving the arm piece 25, 65 therein. Here, the cover 40, 80 may be formed separately from the retainer 23, 63 and may be installed to the wiper arm 20, 60. Alternatively, the cover 40, 80 may be constructed to be installed to the wiper blade 30, 70.

FIG. 6A shows the wiper blades 30, 70, which are placed in the lower turning positions P1a, P2a, respectively. In this state, the wiper blades 30, 70 have the longitudinally overlapped part R and are arranged generally in parallel to each other in the width direction.

The cover 40 extends from the distal end portion of the retainer 23 beyond the connecting pin 31 to a point between the connecting pin 31 and the distal end portion of the wiper blade 30 (a middle point in the overlapped part R). The wiper blade 30 is generally parallel to an extending direction A1 of the wiper arm 20 and of the cover 40 but is shifted a predetermined distance from the wiper arm 20 and the cover 40 on an upper side in a width direction B1 of the cover 40 in FIG. 6A. That is, a widthwise center of the wiper blade 30 is shifted the predetermined distance from a widthwise center of the wiper arm 20 and of the cover 40 on the upper side in the width direction B1 of the cover 40 in FIG. 6A. Thus, the top surface of the wiper blade 30 is covered with one lateral side part (an upper half lateral side part in FIG. 6A) of the cover 40, which is a lateral side part of the cover 40 opposite from the wiper blade 70 in the width direction B1 of the cover 40.

The cover 80 extends from the distal end portion of the retainer 63 beyond the connecting pin 71 to a point between the connecting pin 71 and the distal end portion of the wiper blade 70 (a middle point in the overlapped part R). The wiper blade 70 is generally parallel with an extending direction A2 (the direction A2 being generally parallel with the direction A1) of the wiper arm 60 and of the cover 80 but is shifted a predetermined distance from the wiper arm 60 and the cover 80 on a lower side in the width direction B of the cover 80 in FIG. 6A. Thus, the top surface of the wiper blade 70 is covered with one lateral side part (a lower half lateral side part in FIG. 6A) of the cover 80, which is a lateral side part of the cover 80 opposite from the wiper blade 30 in the width direction B2 of the cover 80.

A distal end portion 41 of the cover 40 is cut at a lower corner thereof at a predetermined angle, and a distal end portion 81 of the cover 80 is cut at an upper corner thereof at a predetermined angle.

In the present embodiment, the covers 40, 80 are identical to each other and are symmetrically arranged on a left side and a right side, respectively. According to the present embodiment, in this way, the same type of component can be used as the cover 40 and the cover 80, so that universality of the components is enhanced.

FIG. 6B shows the wiper blade 30, which is placed in the storage position P1c. At this time, the distal end portions 41, 81 of the covers 40, 80 are opposed to each other and are spaced a relatively small distance X in the longitudinal direction such that the covers 40, 80 are held to extend generally linearly to provide an integral appearance.

In this state, similar to the above state where the wiper blades 30, 70 are placed in the lower turning positions P1a, P2a, respectively, the wiper blades 30, 70 have the longitudinally overlapped part R. Also, in this state, in comparison to the above state where the wiper blades 30, 70 are placed in the lower turning positions P1a, P2a, respectively, the wiper blades 30, 70 become closer to each other in the width direction (B1, B2) and are arranged generally parallel to each other. In the present embodiment, although the wiper blades 30, 70 are arranged generally parallel to each other, the wiper blades 30, 70 may not be necessarily completely parallel to each other.

At this time, a portion of the wiper blade 70, which protrudes from the distal end of the cover 80, i.e., which is not covered with the cover 80, is covered with the lateral side part (lower half lateral side part in FIG. 6B) of the cover 40, which is on the wiper blade 70 side in the width direction B1 of the cover 40. At this time, a portion of the wiper blade 30, which protrudes from the distal end of the cover 40, i.e., which is not covered with the cover 40, is covered with the lateral side part (upper half lateral side part in FIG. 6B) of the cover 80, which is on the wiper blade 30 side in the width direction B2 of the cover 80.

Figure 7:
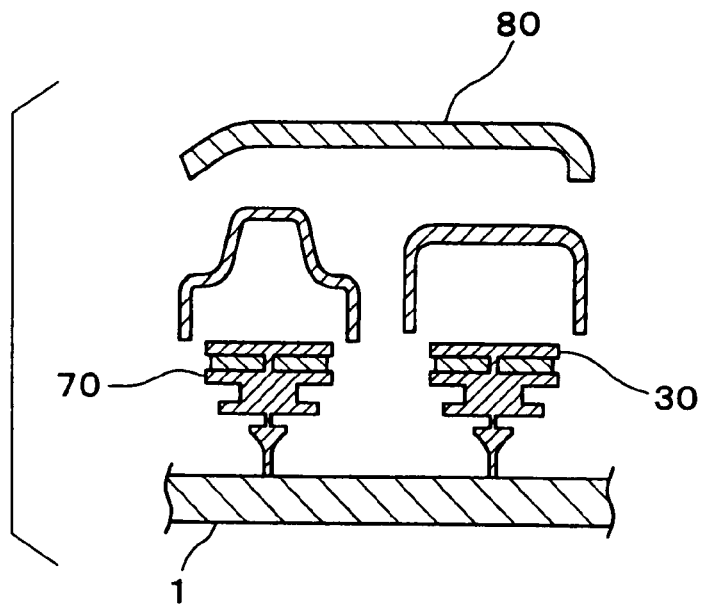
FIG. 7 is a cross sectional view taken along line VII-VII in FIG. 6B.

FIG. 7 is a cross sectional view taken along line VII-VII in FIG. 6B. As shown in FIG. 7, the cover 80 can cover the top surface of the wiper blade 30 and the top surface of the wiper blade 70.

As described above, according to the present embodiment, the covers 40, 80 cooperate with each other to continuously, entirely cover the top surfaces of the wiper arms 20, 60 and of the wiper blades 30, 70.

The distal end portion 41 of the cover 40 and the distal end portion 81 of the cover 80 are cut at generally the same angle to obliquely extend generally in the same direction, so that when the distal end portion 41 and the distal end portion 81 are viewed from each other, each distal end portion 41, 81 forms an undercut shape with respect to the other distal end portion 41, 81. Thus, when the cover 40 is moved from an upper position to the storage position P1c, the distal end portion 41 and the distal end portion 81 will not interfere with each other, and the space between the distal end portion 41 and the distal end portion 81 can be reduced to place them closer to each other. That is, when distal end surfaces of the distal end portions 41, 81 extend in a direction perpendicular to the longitudinal direction, a larger space needs to be provided between the distal end portions 41, 81 to avoid interferences therebetween. However, as in the present embodiment, when the distal end portions 41, 81 form the undercut shape, the space between the distal end portions 41, 81 can be substantially reduced.

When the wiper system W is placed in the storage position, the wiper arms 20, 60 and the wiper blades 30, 70 are arranged continuously in the transverse direction of the vehicle, so that the wiper arms 20, 60 and the wiper blades 30, 70 become less conspicuous due to the continuous arrangement of the wiper arms 20, 60 and the wiper blades 30, 70 in the transverse direction T of the vehicle. Furthermore, in the present embodiment, the wiper blades 30, 70 are continuously covered with the covers 40, 80 in the transverse direction of the vehicle, so that the presence of the wiper blades 30, 70 is almost or substantially unnoticeable from the front side of the vehicle. Therefore, the integral appearance of the wiper system W with respect to the vehicle body is enhanced.

Figure 8:
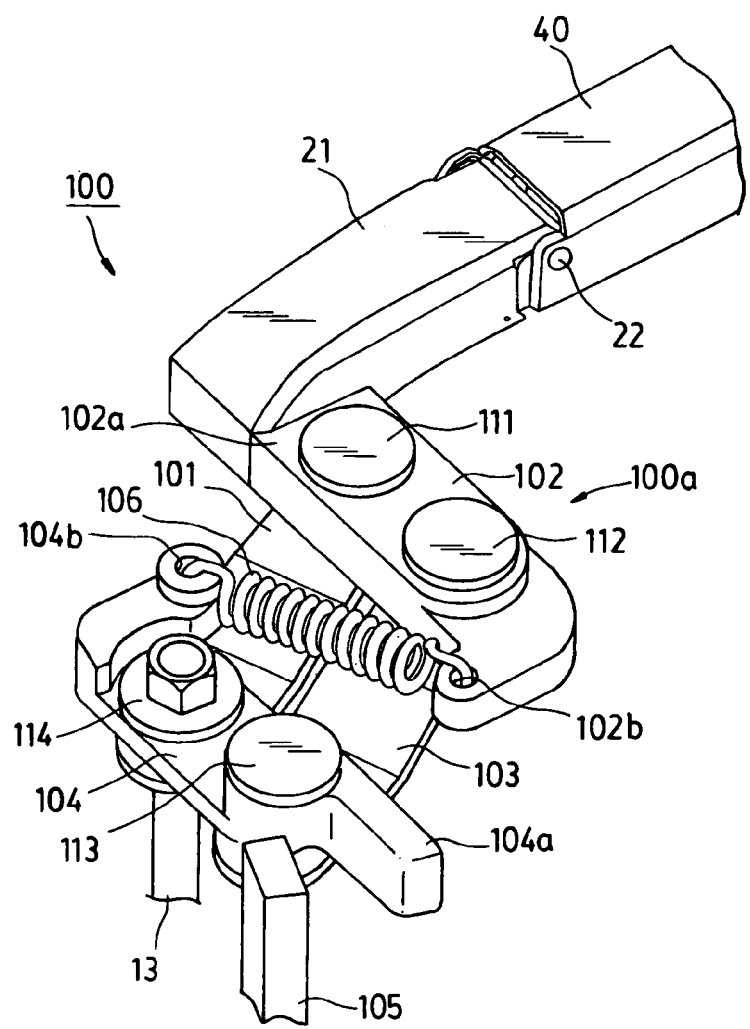
FIG. 8 is a perspective view of a moving mechanism of the wiper system shown in FIG. 1.

Next, the moving mechanism 100 of the present embodiment will be described with reference to FIG. 8.

The moving mechanism 100 includes a first link (a crank arm) 101, a second link 102, a third link 103, a fourth link 104, a stopper 105 and a tension spring (an urging means) 106.

A base end portion of the first link 101 is non-rotatably fixed to the pivot shaft 13, so that the first link 101 is directly driven by a rotational drive force of the wiper motor 10. One end portion of the second link 102 is rotatably connected to a distal end portion of the first link 101 through a first connecting shaft 111. One end portion of the third link 103 is rotatably connected to the other end portion of the second link 102 through a second connecting shaft 112. One end portion of the fourth link 104 is rotatably connected to the other end of the third link 103 through a third connecting shaft 113, and the other end of the fourth link 104 is rotatably connected to the base end portion of the first link 101 through a fourth connecting shaft 114.

An axial direction of the pivot shaft 13, an axial direction of the first connecting shaft 111, an axial direction of the second connecting shaft 112, an axial direction of the third connecting shaft 113 and an axial direction of the fourth connecting shaft 114 are generally parallel with each other. In the present embodiment, the first link 101, the second link 102, the third link 103 and the fourth link 104 form a four-bar linkage 100a. Particularly, in the present embodiment, the first link 101 and the third link 103 are generally parallel to each other, and the second link 102 and the fourth link 104 are generally parallel to each other. A center-to-center distance (also referred to as an axis-to-axis distance) between the first connecting shaft 111 and the second connecting shaft 112 is generally the same as a center-to-center distance between the third connecting shaft 113 and the fourth connecting shaft 114. Furthermore, a center-to-center distance between the second connecting shaft 112 and the third connecting shaft 113 is generally the same as a center-to-center distance between the fourth connecting shaft 114 and the first connecting shaft 111. Thus, the four-bar linkage 100a of the present embodiment forms a parallelogram or a rectangle. The shape of the four-bar linkage 100a is not limited to this. For example, the four-bar linkage 100a may form any other shape other than the parallelogram and the rectangle.

In the present embodiment, the pivot shaft 13 and the fourth connecting shaft 114 are coaxial to each other, and a center axis of the pivot shaft 13 coincides with a center axis of the fourth connecting shaft 114. Furthermore, although the pivot shaft 13 is fixed to the first link 101, the pivot shaft 13 is rotatable relative to the fourth link 104. Thus, the fourth link 104 is not directly synchronized with the rotation of the pivot shaft 13.

The second link 102 has an extension 102a, which is provided to the one end portion of the second link 102 to extend beyond the first connecting shaft 111. The arm head 21 of the wiper arm 20 is formed in or joined to this extension 102a. In the present embodiment, the wiper arm 20 is connected to the extension 102a in such a manner that an extending direction of the wiper arm 20 is generally perpendicular to an extending direction of the extension 102a.

Furthermore, an engaging hole 102b is formed in the other end portion of the second link 102 such that one end of the tension spring 106 is engaged with the engaging hole 102b at a location beyond the second connecting shaft 112.

An engaging portion 104a extends at the one end portion of the fourth link 104 beyond the third connecting shaft 113. The stopper 105 protrudes at the gear unit 12. When the pivot shaft 13 is rotated to a predetermined rotational angle (a predetermined angular position), the stopper 105 is engaged with the engaging portion 104a.

Furthermore, an engaging hole 104b is formed in the other end portion of the fourth link 104 such that the other end of the tension spring 106 is engaged with the engaging hole 104b at a location beyond the fourth connecting shaft 114.

As described above, the one end and the other end of the tension spring 106 are engaged with the engaging hole 102b of the second link 102 and the engaging hole 104b of the fourth link 104, respectively. Thus, the tension spring 106 always applies a predetermined urging force to the four-bar linkage 100a to urge the second connecting shaft 112 and the fourth connecting shaft 114 toward each other. In this way, the four-bar linkage 100a is held to form the generally parallelogram (see FIG. 8). In this generally parallelogram shaped state, the center-to-center distance between the second connecting shaft 112 and the fourth connecting shaft 114 is shorter than the center-to-center distance between the first connecting shaft 111 and the third connecting shaft 113. In the present embodiment, the tension spring 106 is used as the urging means, so that an axial size of the pivot shaft 13 is minimized, and the moving mechanism 100 is formed as the relatively simple and compact structure.

Figure 9A:
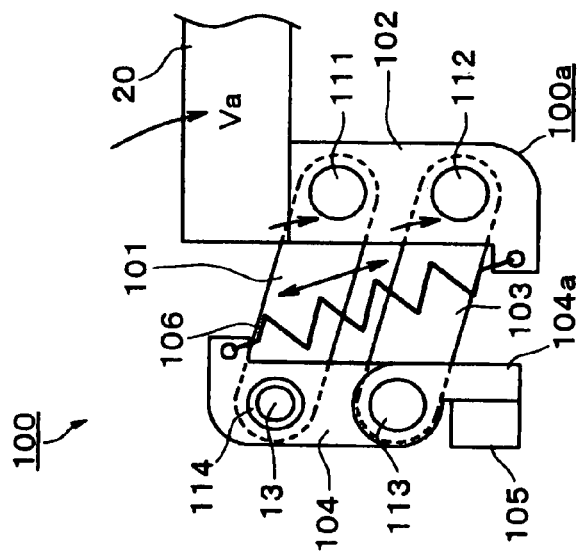
FIGS. 9A to 9C are descriptive views showing various operational states of the moving mechanism of the wiper system of FIG. 1.

Furthermore, in an operational state where the pivot shaft 13 is rotated in a direction opposite from the wiping range, i.e., is rotated in a clockwise direction in FIG. 9A, when a wiping load is applied to the wiper blade 30 to cause arresting of the wiping movement of the wiper blade 30, the tension spring 106 receives an external force caused by a rotational torque exerted around the pivot shaft 13. In the present embodiment, the above predictable wiping load is preset. The urging force of the tension spring 106 is set to limit expansion of the tension spring 106 even if such a preset wiping load is applied to the tension spring 106. In other words, the urging force of the tension spring 106 is set to limit a substantial increase in a space between the second connecting shaft 112 and the fourth connecting shaft 114 when the wiping load, which is applied to the wiper blade 30 from the wiping surface 1a in a wiping movement start direction of the wiper blade 30, is equal to or less than a predetermined amount, which corresponds to the above preset predictable wiping load. In this way, according to the present embodiment, in the normal wiping movement, the tension spring 106 is not substantially expanded, so that the four-bar linkage 100a maintains its normal shape to stabilize the behavior of the wiper arm 20 and of the wiper blade 30.

In the present embodiment, a degree of flatness of the parallelogram of the four-bar linkage 100a is determined by a length of the tension spring 106, which is measured in a relaxed state. Alternatively, the degree of flatness of the parallelogram of the four-bar linkage 100a may be determined through the contact between the first link 101 and the third link 103 in the width direction or the contact between the second link 102 and the fourth link 104 upon transformation of the four-bar linkage 100a.

In the present embodiment, the tension spring 106 is used as the urging means. Alternatively, any other device may be used as the urging means as long as it can urge the four-bar linkage 100a in such a manner that the second connecting shaft 112 and the fourth connecting shaft 114 are urged toward each other (or alternatively, the first connecting shaft 111 and the third connecting shaft 113 are urged away from each other). For example, an engaging portion may be provided to the first connecting shaft 111, and another engaging portion may be provided to the third connecting shaft 113. Then, ends of a compression spring may be connected to these two engaging portions. Furthermore, instead of using the tension spring or the compression spring, a torsion spring may be used. In this case, the torsion spring may be provided around the second connecting shaft 112. One end of the torsion spring may be connected to the second link 102, and the other end of the torsion spring may be connected to the third link 103. In this way, with reference to FIG. 8, the second link 102 is urged in the clockwise direction about the second connecting shaft 112, and the third link 103 is urged in the counter clockwise direction about the second connecting shaft 112. Thereby, the third link 103 is urged in the counter clockwise direction. Thus, the urging force is applied to the four-bar linkage 100a to urge the second connecting shaft 112 and the fourth connecting shaft 114 toward each other. The torsion spring may also be provided to the first connecting shaft 111, the third connecting shaft 113 and the fourth connecting shaft 114 besides the second connecting shaft 112.

Next, an operation of the moving mechanism 100 of the present embodiment will be described with reference to FIGS. 9A to 9C. In the following description, the reciprocal wiping movement and the movement from the reciprocal wiping position to the storage position will be described. The movement from the storage position to the wiping position is opposite from the movement from the reciprocal wiping position to the storage position and thereby will not be described for the sake of simplicity.

FIG. 9A shows a state, in which the controller 90 outputs the drive signal to operate the wiper mechanism W1 continuously, and the wiper blade 30 is reciprocally wiping the wiping range P1 between the lower turning position P1a and the upper turning position P1b. At this time, in the moving mechanism 100, the four-bar linkage 100a forms the parallelogram by urging the second connecting shaft 112 and the fourth connecting shaft 114 toward each other through use of the urging force of the tension spring 106.

Figure 9B:
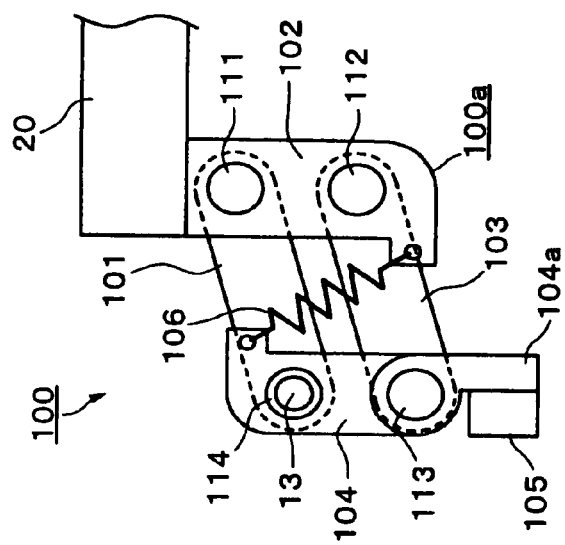

FIG. 9B shows a state, in which the four-bar linkage 100a maintains the parallelogram, and the engaging portion 104a of the fourth link 104 is engaged with the stopper 105. According to the present embodiment, at this time, the wiper blade 30 is set to be placed in the lower turning position P1a, and the wiper arm 20 and the wiper blade 30 are placed to extend generally in the horizontal direction.

In the present embodiment, at the time of engagement between the engaging portion 104a and the stopper 105, the wiper blade 30 is placed in the lower turning position P1a. Alternatively, a position of the engaging portion 104a immediately before engagement with the stopper 105 may be set to correspond with the lower turning position P1a. In this way, the engaging portion 104a will not be often engaged with the stopper 105 in the normal wiping operation, so that it is possible to limit generation of engaging sound (hitting sound).

In the case where the wiper mechanism W1 is shifted from the operational state (FIG. 9A) to the stop state, the controller 90 outputs the drive signal to the wiper motor 10 to rotate the pivot shaft 13 by a predetermined rotational angle from the state shown in FIG. 9B in the direction Va (the clockwise direction in FIG. 9B) opposite from the wiping range.

When the pivot shaft 13 is rotated in the direction opposite from the wiping range, the first link 101, which is fixed to the pivot shaft 13, is swung in the direction (the clockwise direction) opposite from the wiping range. Furthermore, the third link 103 is synchronized with the rotation of the first link 101, so that the third link 103 is swung about the third connecting shaft 113 while maintaining the generally parallel relationship with the first link 101.

At this time, the engaging portion 104a is engaged with the stopper 105, so that rotation of the fourth link 104 is limited. Therefore, due to the rotation of the first link 101 and the third link 103, the four-bar linkage 100a is shifted from the state of forming the parallelogram to the state of forming the rectangle. Due to this shifting, the center-to-center distance between the second connecting shaft 112 and the fourth connecting shaft 114 is increased, and thereby the tension spring 106 is expanded. In other words, the shape of the four-bar linkage 100a is transformed to the rectangle against the tensile force of the tension spring 106.

When this transformation takes place, the second link 102, which is connected to the first link 101 and the third link 103, makes the translational movement in the direction opposite from the wiping range to maintain the generally parallel relationship between the second link 102 and the fourth link 104. Then, the wiper arm 20 and the wiper blade 30, which are connected to the second link 102, make the translational movement while maintaining the horizontal posture thereof.

Figure 9C:
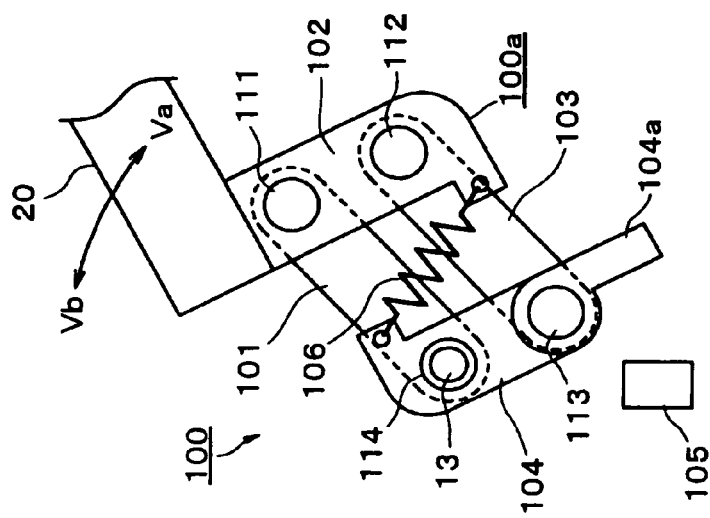

FIG. 9C shows the state where the wiper blade 30, which is placed in the storage position P1c. In this embodiment, the shape of the four-bar linkage 100a is transformed to the rectangle and is thereafter transformed to the parallelogram.

As described above, the moving mechanism 100 of the present embodiment enables the stable translational movement of the wiper arm 20 and the wiper blade 30 from the lower turning position P1a to the storage position P1c while maintaining the horizontal posture thereof upon the rotation of the pivot shaft 13.

Furthermore, in the present embodiment, the controller 90 rotates the wiper motor 10 forward and backward by the predetermined angle through the serve control. In this way, the controller 90 reciprocally rotates the pivot shaft 13 and the wiper arm 20 by the predetermined rotational angle. Furthermore, in the present embodiment, the controller 90 rotates the wiper motor 10 by the predetermined angle out of the reciprocal wiping range, so that the moving mechanism 100 is operated to generally horizontally move the wiper arm 20 and the wiper blade 30.

Therefore, according to the present embodiment, through use of the controller 90, it is possible to relatively easily set the reciprocal rotation for the reciprocal wiping movement and the predetermined rotation for the stop movement. Furthermore, this kind of change in the setting of the rotational angle does not require a mechanical change and can be accomplished by a change in the software in the controller 90.

In the present embodiment, the four-bar linkage 100a forms the parallelogram in the storage position P1c. Alternatively, the four-bar linkage 100a may be set to form the rectangle at the storage position P1c. Through the appropriate setting, the translational moving distance can be easily set to a desired value.

Furthermore, the moving mechanism 100 of the present embodiment is constructed to be driven by the wiper motor 10. When the moving mechanism 100 makes the translational movement of the wiper arm 20, it is preferred to rotate the wiper motor 10 at a relatively slow rotational speed. In this way, at the storage position, the moving speed of the cover 40 becomes relatively slow, so that collision of the cover 40 to the cover 80 due to inertial force can be limited, and thereby the cover 40 can be moved in the stable manner.

Now, modifications of the first embodiment will be described.

In the first embodiment, the moving mechanism 100 is provided only in the wiper mechanism W1. Alternatively, the moving mechanism 100 may be provided to the wiper mechanism W2. When the moving mechanism 100 is provided to the two wiper mechanisms W1, W2, the wiper arms 20, 60 and the wiper blades 30, 70 can be moved to the storage positions P1c, P2c, respectively, while maintaining the horizontal posture thereof.

In the first embodiment, the wiper system W has the two wiper mechanisms. However, the number of the wiper mechanisms of the wiper system W is not limited to two and may be changed to three or more, if desired.

In the first embodiment, the cover 40 and the cover 80 are identical and thereby the same type of component. One half of the overlapped part R of the wiper blades 30, 70 in the longitudinal direction is covered with the cover 40, and the other one half of the overlapped part R of the wiper blades 30, 70 in the longitudinal direction is covered with the cover 80. This may be modified in a manner shown in FIGS. 10A to 11B.

In the modification of FIGS. 10A and 10B, covers 40A, 80A are provided to the wiper arms 20, 60, respectively, as shown in FIG. 10A. The cover 40A entirely covers the top surface of the wiper blade 30. In order to implement this, the cover 40A extends distally to a point, which is slightly ahead of the distal end of the wiper blade 30, to entirely cover the top surface of the wiper blade 30. The cover 80A covers a relatively small area of a base end portion of the top surface of the wiper blade 70, so that the length of the cover 80A is made relatively short.

In the present modification, when the wiper arm 20 and the wiper blade 30 are moved from the lower turning position P1a (FIG. 10A) to the storage position P1c, covers 40A, 80A are placed to extend linearly, continuously in the transverse direction of the vehicle, as shown in FIG. 10B. Thus, the wiper arms 20, 60 and the wiper blades 30, 70 are generally entirely covered with the covers 40A, 80A. At this time, the overlapped part R is entirely covered with the cover 40A. In this way, in a case where the wiper blade 70 is designed to reciprocally wipe a driver seat side portion of the glass 1, the cover 80A will not move across a line of sight of the driver, so that the view of the driver will not be blocked by the cover 80A.

Figure 11A:
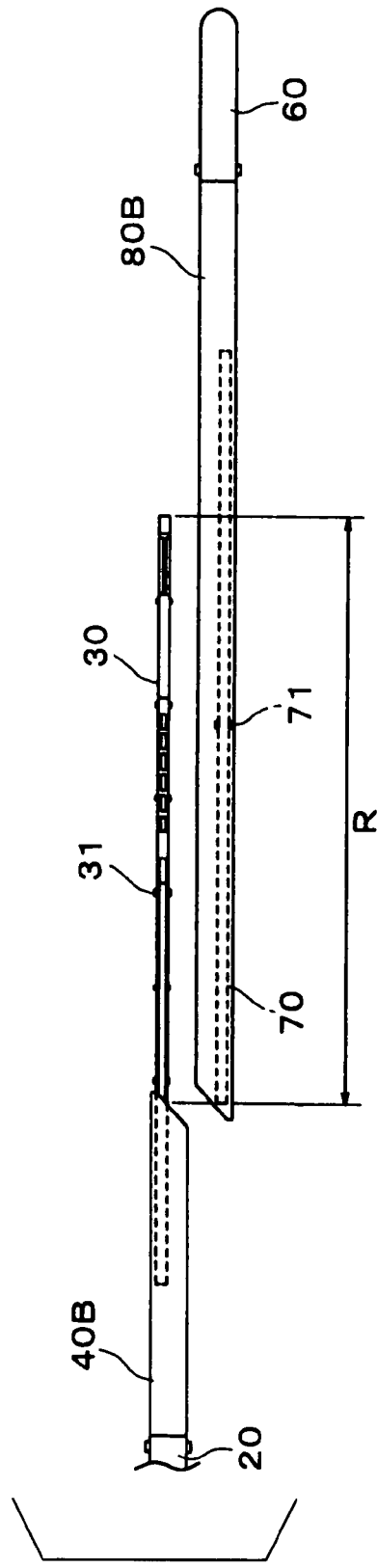
FIG. 11A is a descriptive diagram showing another modification of the wiper system of the first embodiment placed in a lower turning position.
Figure 11B:
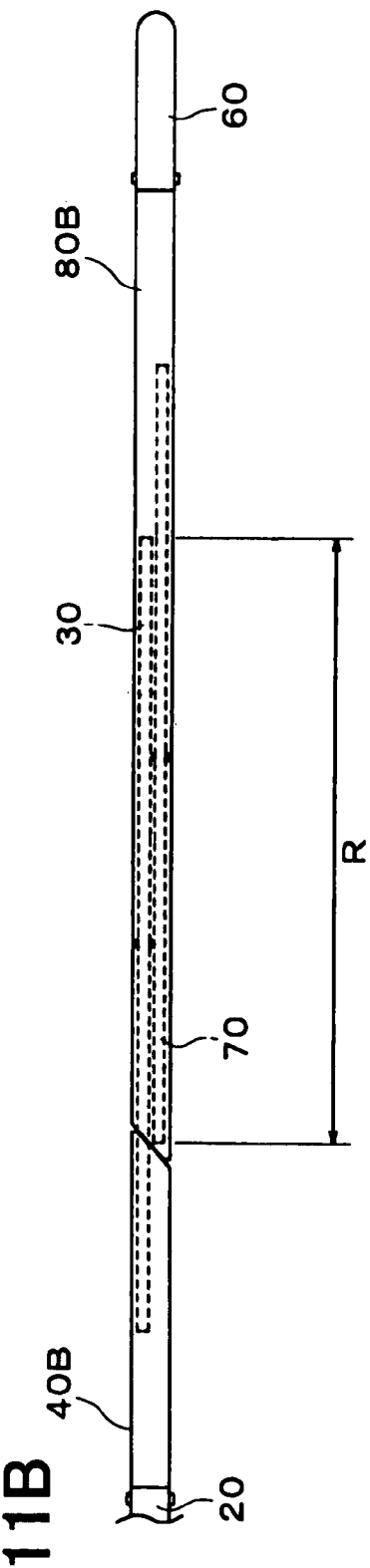
FIG. 11B is a descriptive diagram showing the modification of the wiper system of FIG. 11A placed in a storage position.

FIGS. 11A and 11B show another modification of the first embodiment. In contrast to the above modification of FIGS. 10A and 10B, the length of the cover 40B, which is provided to the wiper arm 20, is made shorter than the length of the cover 80B, which is provided to the wiper arm 60. The cover 40B covers a relatively small area of a base end portion of the top surface of the wiper blade 30, so that the length of the cover 40B is made relatively short. In contrast, the cover 80B extends distally to a point, which is slightly ahead of the distal end of the wiper blade 70, to entirely cover the top surface of the wiper blade 70.

In the modification of FIGS. 11A, 11B, when the wiper arm 20 and the wiper blade 30 are moved from the lower turning position P1a (FIG. 11A) to the storage position P1c, covers 40B, 80B are placed to extend linearly, continuously in the transverse direction of the vehicle, as shown in FIG. 11B. Thus, the wiper arms 20, 60 and the wiper blades 30, 70 are generally entirely covered with the covers 40B, 80B. At this time, the overlapped part R is entirely covered with the cover 80B. In this way, in a case where the wiper blade 30 is designed to reciprocally wipe the driver seat side portion of the glass 1, the cover 40B will not move across the line of sight of the driver, so that the view of the driver will not be blocked by the cover 40B.

In each of the above modifications shown in FIGS. 10A to 11B, although the lengths of the covers 40A, 40B, 80A, 80B differ from one another, the top surfaces of the wiper arms 20, 60 and of the wiper blades 30, 70 including the overlapped part R can be effectively covered with these covers 40A, 40B, 80A, 80B. Furthermore, as long as the top surfaces of wiper arms 20, 60 and of the wiper blades 30, 70 can be covered with the covers, the lengths of the covers can be appropriately adjusted to limit the blocking of the line of sight of the driver.

Second Embodiment

A second embodiment of the present invention will be described with reference to FIG. 12A, and modifications thereof will be described with reference to FIGS. 12B and 12C. Here, it should be noted that in the second embodiment and the subsequent embodiments, components similar to those of the first embodiment will be indicated by the same numerals and will not be described further for the sake of simplicity.

In the first embodiment, the wiper system W is the opposed pattern wiper. However, the present invention is not limited to this. Specifically, as shown in FIG. 12A, a wiper system according to the second embodiment is a tandem wiper system, in which two wiper mechanisms initiate its reciprocal swing wiping movement in a common direction from a corresponding storage position.

Figure 12A:
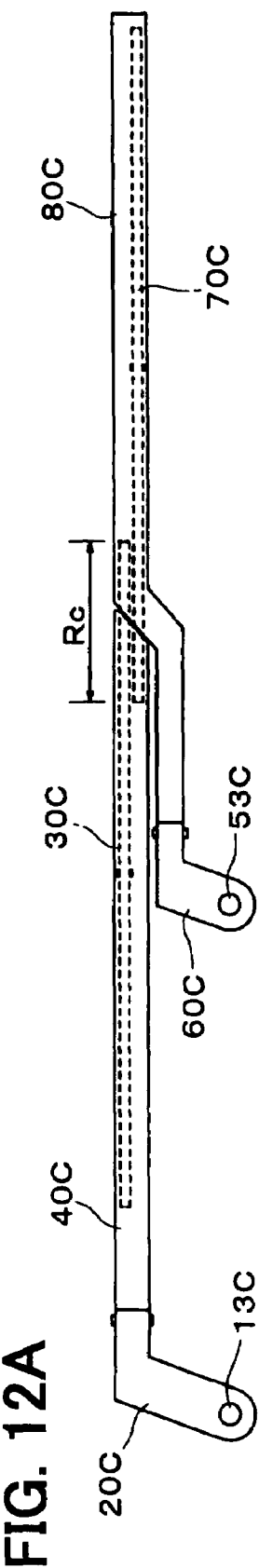
FIGS. 12A to 12C are descriptive diagrams showing a wiper system of a second embodiment and its modifications.

With reference to FIG. 12A, two wiper mechanisms are provided at a vehicle right side and at or around a vehicle transverse center, respectively. The right side wiper mechanism, which is provided to the vehicle right side, includes a wiper arm 20C, a wiper blade 30C and a cover 40C. The wiper arm 20C is fixed to a pivot shaft 13C, which is provided to the vehicle right side. The wiper blade 30C is installed to a distal end portion of the wiper arm 20C. The cover 40C covers a top surface of the wiper arm 20C and a top surface of the wiper blade 30C. The center side wiper mechanism, which is provided at or around the vehicle transverse center, includes a wiper arm 60C, a wiper blade 70C and a cover 80C. The wiper arm 60C is fixed to a pivot shaft 53C, which is provided at or around the vehicle transverse center. The wiper blade 70C is installed to a distal end portion of the wiper arm 60C. The cover 80C covers a top surface of the wiper arm 60C and a top surface of the wiper blade 70C.

At the storage position, the wiper blades 30C, 70C form an longitudinally overlapped part Rc and are arranged one after another in the transverse direction of the vehicle in a generally parallel relationship. At the storage position, the wiper blade 30C is placed above the pivot shaft 53C, and a base end portion of the cover 80C is placed below the cover 40C to extend generally parallel with the cover 40C. Furthermore, around a distal end of the cover 40C, the cover 80C is bent upwardly and then extends continuously from the cover 40C in an extending direction of the cover 40C.

In FIG. 12A, the cover 40C covers generally one half of the overlapped part Rc, and the cover 80C covers generally the remaining one half of the overlapped part Rc.

Figure 12B:
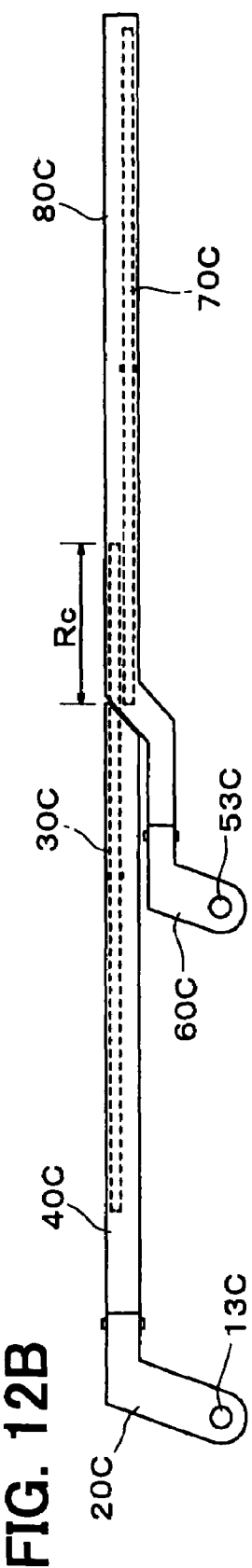

FIG. 12B shows a modification of the wiper system shown in FIG. 12A. The length of the cover 40C of FIG. 12B is made shorter than that of FIG. 12A, and the cover 80C of FIG. 12B is bent at a location, which is closer to a base end of the cover 80C in comparison to that of FIG. 12A. In this way, in FIG. 12B, the overlapped part Rc is generally entirely covered with the cover 80C.

Figure 12C:
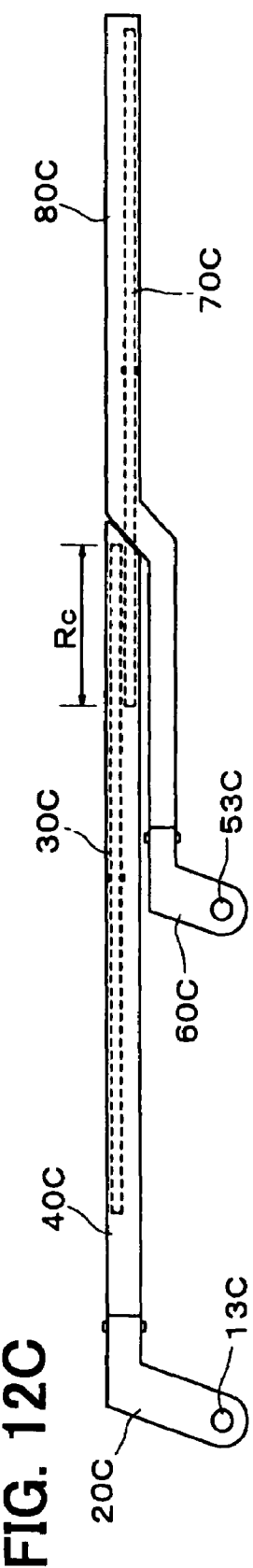

FIG. 12C shows another modification of the wiper system shown in FIG. 12A. The length of the cover 40C of FIG. 12C is made longer than that of FIG. 12A, and the cover 80C of FIG. 12C is bent at a location, which is closer to a distal end of the cover 80C in comparison to that of FIG. 12A. In this way, in FIG. 12C, the overlapped part Rc is generally entirely covered with the cover 40C.

With the structures of FIGS. 12A-12C, even in the tandem wiper system, at the storage position, the covers 40C, 80C are placed to continuously linearly extend in the longitudinal direction to cover generally the entire length of the wiper arms 20C, 60C and of the wiper blades 30C, 70C.

Third Embodiment

Now, a third embodiment of the present invention will be described with reference to FIGS. 13 to 16.

In the first embodiment, the wiper arms 20, 60 are separately driven by the separate wiper motors 10, 50, respectively. However, the present invention is not limited to this.

Figure 13:
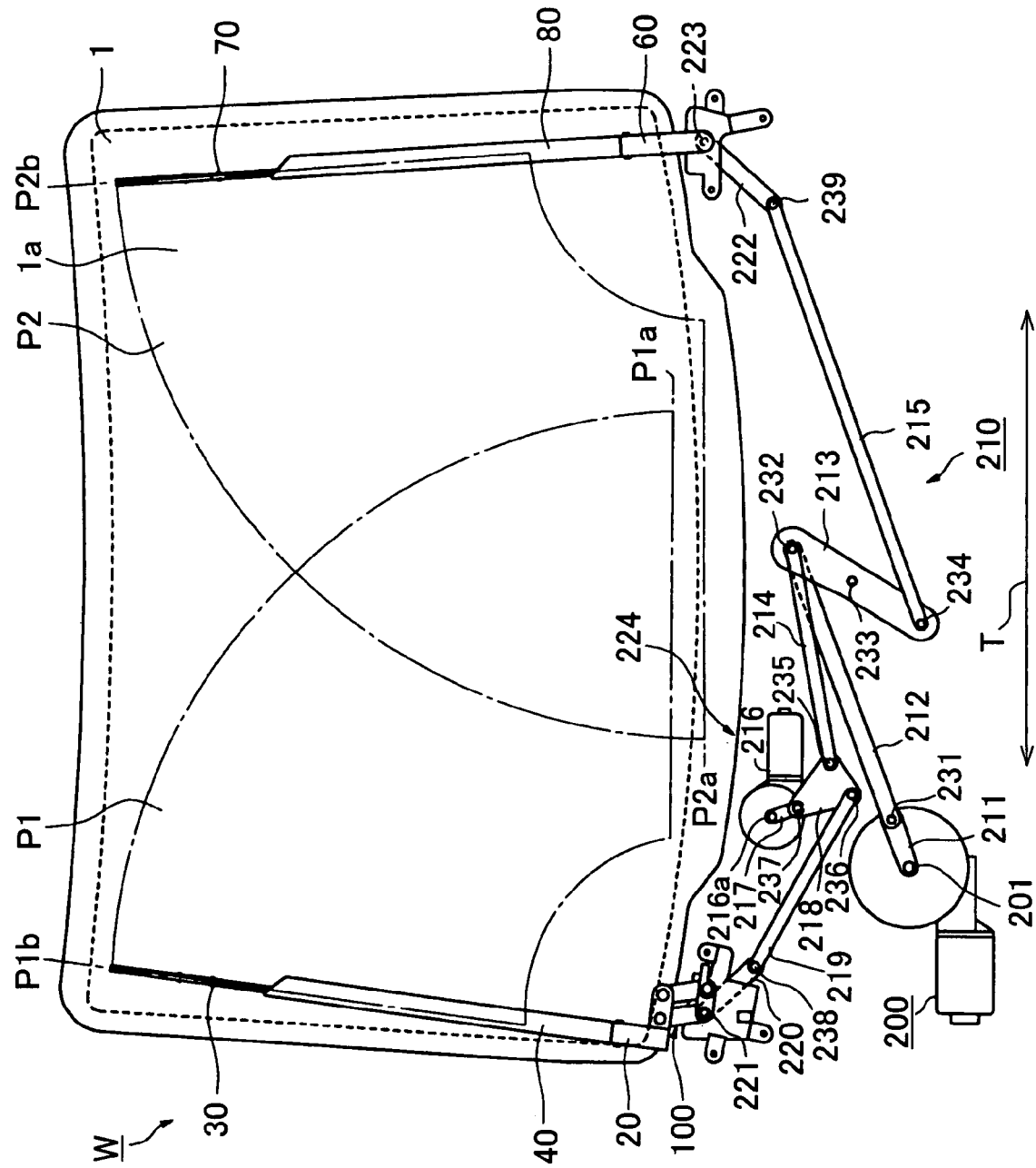
FIG. 13 is a schematic diagram showing a wiper system of a third embodiment, in which wiper blades are respectively held in an upper turning position thereof.
Figure 14:
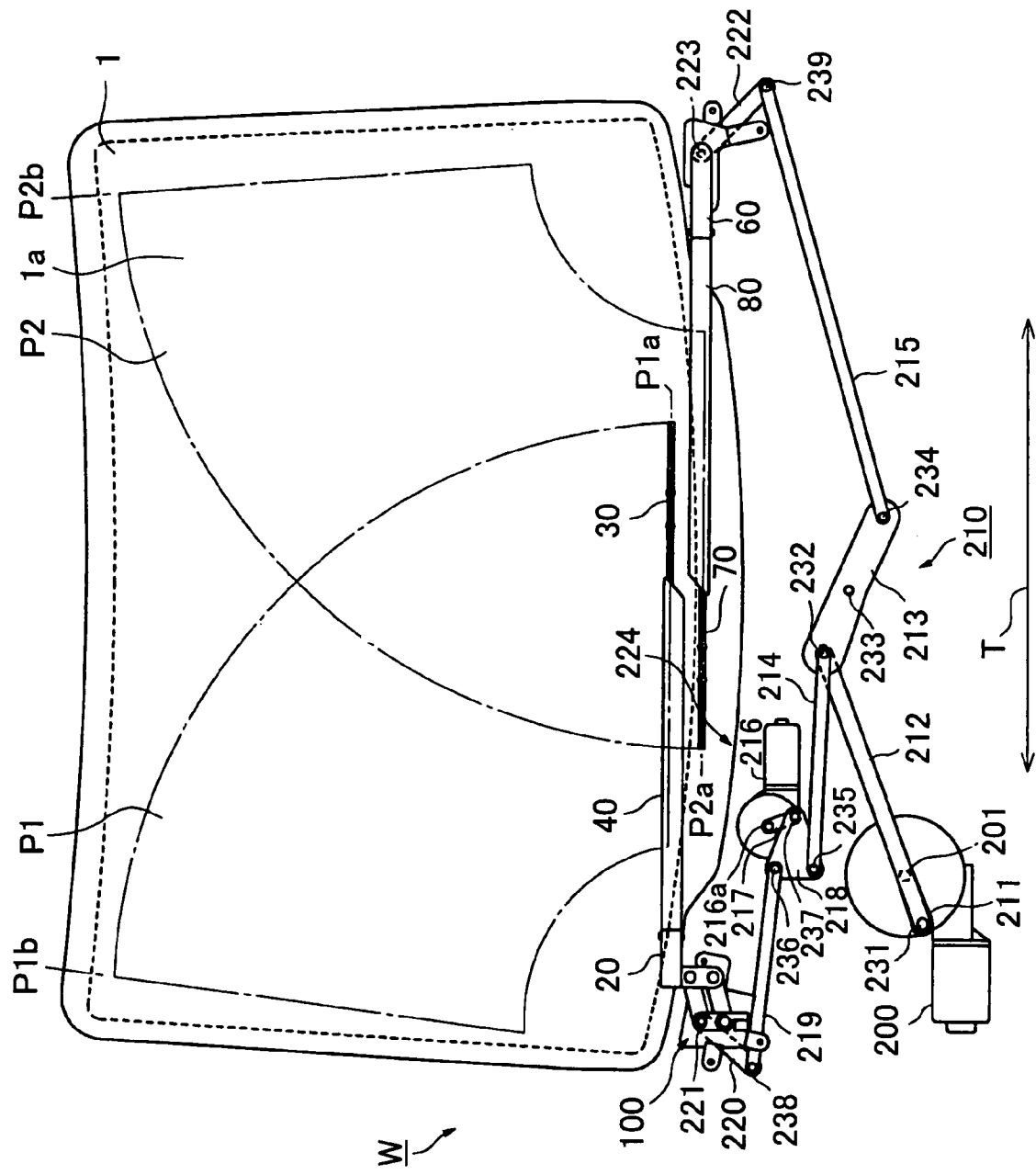
FIG. 14 is a schematic diagram showing the wiper system of FIG. 13, in which the wiper blades are respectively held in a lower turning position thereof.
Figure 15:
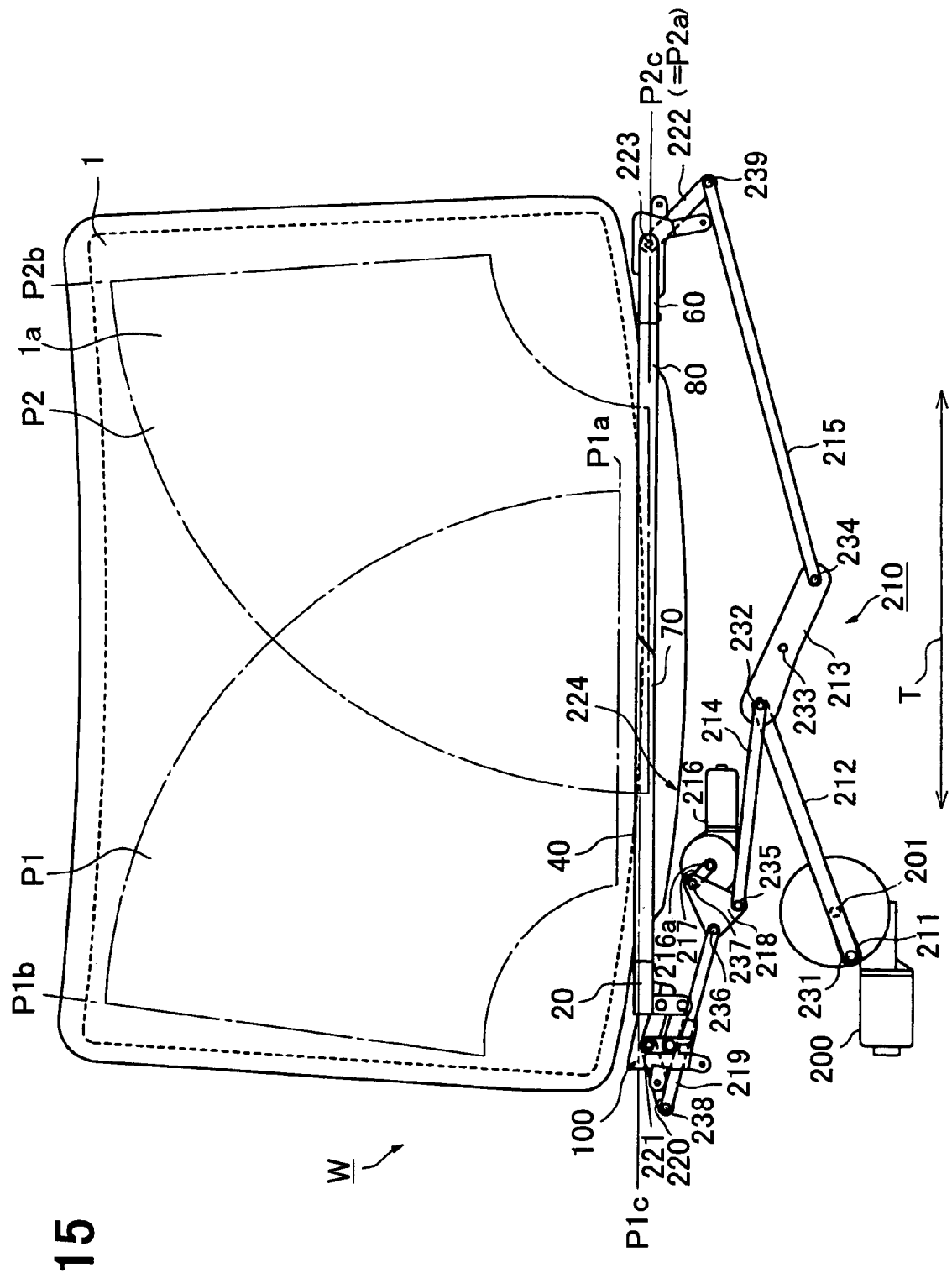
FIG. 15 is a schematic diagram showing the wiper system of FIG. 13, in which the wiper blades are respectively held in a storage position thereof.

As shown in FIGS. 13 to 15, a wiper system W according to a third embodiment includes two wiper arms 20, 60, two wiper blades 30, 70, two covers 40, 80 and a moving mechanism 100. In place of the wiper motors 10, 50, the wiper system W of the present embodiment includes a wiper motor 200 and a link mechanism 210.

The wiper motor 200 is an electric motor, which rotates in a single direction to reciprocally swing the wiper arms 20, 60. Alternatively, the wiper motor 200 may be rotated forward and backward to reciprocally swing the wiper arms 20, 60.

The link mechanism 210 includes a crank arm 211, a rod 212, a bell crank 213, a rod 214, a rod 215, a rise-up motor 216, a crank arm 217, a segment lever 218, a rod 219, a pivot lever 220, a pivot shaft 221, a pivot lever 222 and a pivot shaft 223.

The rise-up motor 216, the crank arm 217 and the segment lever 218 form a rise-up mechanism 224.

A base end portion of the crank arm 211 is fixed to an output shaft 201 of the wiper motor 200, and a distal end portion of the crank arm 211 is rotatably connected to one end portion of the rod 212 through a ball joint 231. The other end portion of the rod 212 is rotatably connected to one end portion of the bell crank 213 through a ball joint 232. One end portion of the rod 214 is rotatably connected to the ball joint 232.

The bell crank 213 is rotatably supported by a support shaft 233, which is supported by a body of the vehicle. One end portion of the rod 215 is rotatably connected to the other end portion of the bell crank 213 through a ball joint 234.

The other end portion of the rod 214 and one end portion of the rod 219 are connected with each other through the segment lever 218 of the rise-up mechanism 224.

A distal end portion of the pivot lever 220 is rotatably connected to the other end portion of the rod 219 through a ball joint 238. A base end portion of the pivot lever 220 is fixed to a lower portion of the pivot shaft 221. The moving mechanism 100 (the first link 101) is connected to a distal end portion of the pivot shaft 221. Therefore, when the pivot shaft 221 is reciprocally rotated through the movement of the pivot lever 220, the wiper arm 20 is swung through the moving mechanism 100.

A distal end portion of the pivot lever 222 is rotatably connected to the other end portion of the rod 215 through a ball joint 239. A base end portion of the pivot lever 222 is fixed to a lower portion of the pivot shaft 223, and the wiper arm 60 is connected to a distal end portion of the pivot shaft 223. Therefore, when the pivot shaft 223 is reciprocally rotated through the movement of the pivot lever 222, the wiper arm 60 is swung.

The rise-up mechanism 224 is shiftable between two positions, i.e., a wiping position (see FIGS. 13 and 14) and a storage position (see FIG. 15). When the rise-up mechanism 224 is placed in the wiping position, the wiper arm 20 can wipe the wiping range P1. When the rise-up mechanism 224 is in the storage position, the wiper arm 20 can move to the storage position P1c.

In the rise-up mechanism 224, a base end portion of the crank arm 217 is fixed to an output shaft 216a of the rise-up motor 216, and a base end portion of the segment lever 218 is rotatably connected to a distal end portion of the crank arm 217 through a ball joint 237.

Two connections, which are spaced from each other in a circumferential direction, are formed in a distal end portion of the segment lever 218. Ball joints 235, 236 are provided to these connections, respectively. The other end portion of the rod 214 is connected to the segment lever 218 through the ball joint 235, and the one end of the rod 219 is connected to the segment lever 218 through the ball joint 236.

Figure 16:
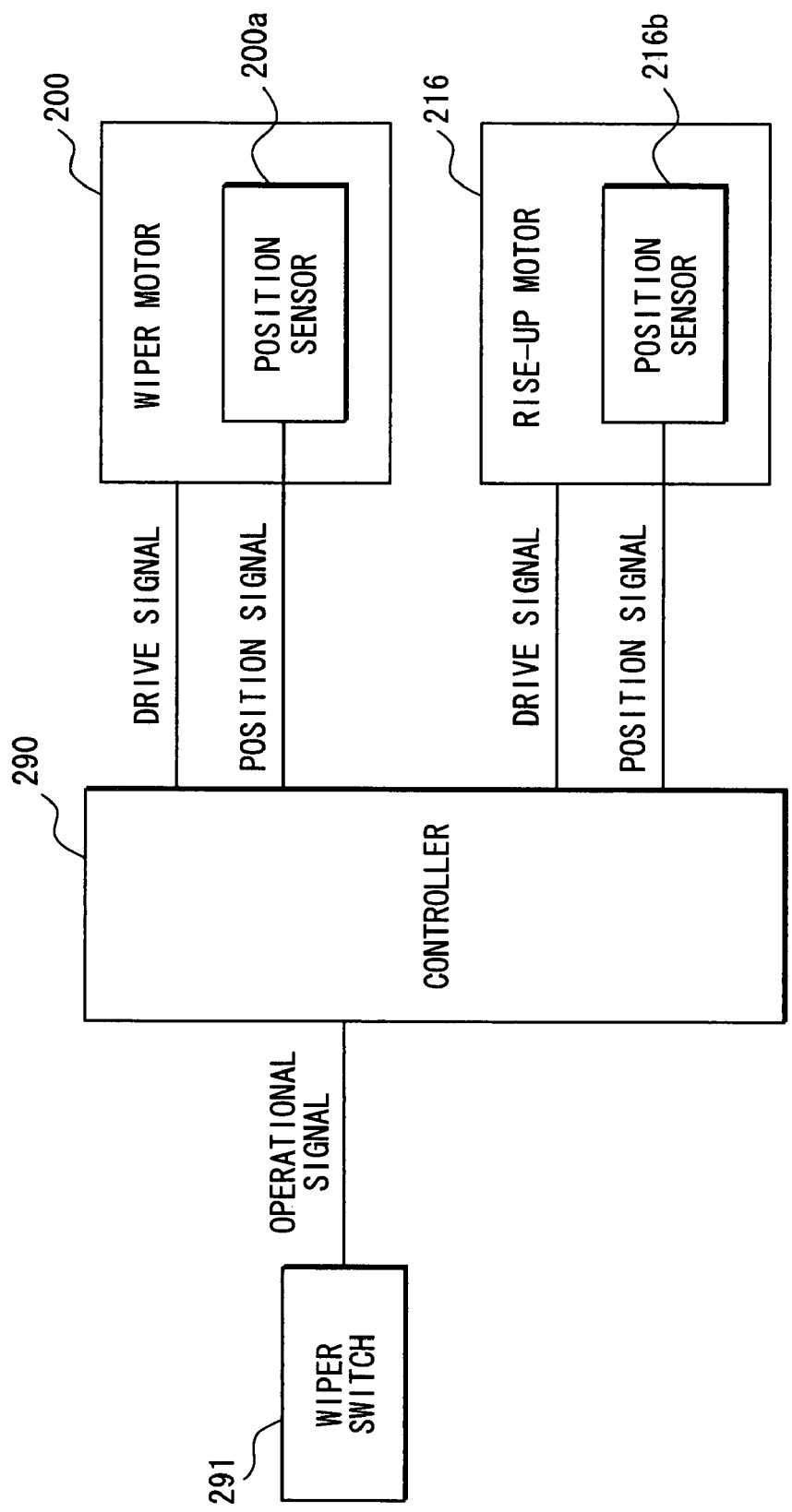
FIG. 16 is a schematic diagram showing an electrical structure of the wiper system of FIG. 13.

As shown in FIG. 16, the wiper motor 200 is constructed to operate based on a drive signal received from a controller 290. The controller 290 is connected to a wiper switch 291 and two position sensors 200a, 216b. The position sensors 200a, 216b are installed in the wiper motor 200 and the rise-up motor 216, respectively. Similar to the position sensors 14, 54 of the first embodiment, the position sensors 200a, 216b are magnet sensors.

When the controller 290 receives an operational signal from the wiper switch 291, the controller 290 controls the wiper motor 200 and the rise-up motor 216 at a predetermined sequence. That is, when the controller 290 receives the operational signal at the storage position, the controller 290 operates the rise-up motor 216 to move the crank arm 217 from the storage position to the wiping position (resulting in a change from the state of FIG. 15 to the state of FIG. 14). When the controller 290 determines that the crank arm 217 is moved from the storage position to the wiping position based on pulse signals received from the position sensor 216b, the controller 290 outputs a drive signal to the wiper motor 200 to operate the wiper motor 200. In this way, the wiper arms 20, 60 are swung.

In the middle of the continuous swing operation of the wiper arms 20, 60, when the operational signal from the wiper switch 291 stops or when an OFF signal is received from the wiper switch 291, the controller 290 stops the crank arm 211 at a rotational angular position, which corresponds to the lower wiping stop position, based on pulse signals received from the position sensor 200a (see FIG. 14). When the controller 290 determines that the crank arm 211 is stopped at the rotational angular position, which corresponds to the lower wiping stop position, the controller 290 drives the rise-up motor 216 to shift from the wiping position to the storage position (thereby, resulting in a change from the state of FIG. 14 to the state of FIG. 15).

Next, an operation of the wiper system W of the third embodiment will be described with reference to FIGS. 13 to 15.

FIG. 13 shows the state where the wiper arms 20, 60 are moved to the upper turning positions P1b, P2b, respectively, like in FIG. 1. FIG. 14 shows the state where the wiper arms 20, 60 are moved to the lower turning positions P1a, P2a, respectively, like in FIG. 2. FIG. 15 shows the state where the wiper arm 20 is moved to the storage position P1c like that of FIG. 3.

As shown in FIGS. 13 and 14, in the state where the rise-up mechanism 224 is in the wiping position, when the wiper motor 200 is operated to rotate the crank arm 211 in one direction, the rod 212 is moved forward and backward in response to the rotation of the crank arm 211. The bell crank 213 is swung about the support shaft 233 due to the movement of the rod 212.

When the bell crank 213 is swung, the rod 214 and the rod 215, which are connected to the one end portion and the other end portion, respectively, of the bell crank 213, are moved forward and backward in the left-to-right direction.

The segment lever 218 is swung about the ball joint 237 due to the forward and backward movement of the rod 214, and the rod 219 is moved forward and backward due to the swing movement of the segment lever 218. At this time, the rise-up motor 216 of the rise-up mechanism 224 is held in a stopped state, and thereby the crank arm 217 is kept stopped.

When the left and right rods 219, 215 are moved forward and backward in the above described manner, the pivot levers 220, 222 are swung within a predetermined angular range. In this way, the wiper arms 20, 60 are swung, and thereby the wiper blades 30, 70 reciprocally wipe the wiping surface 1a of the glass 1 in the wiping ranges P1, P2, respectively.

At the time of moving the wiper arms 20, 60 to the storage position, the wiper motor 200 is stopped in a state where the wiper arms 20, 60 are placed in the lower turning positions P1a, P2a, respectively, as shown in FIG. 14.

In this state, the rise-up motor 216 is operated, so that the crank arm 217 is rotated in the clockwise direction to move from the wiping position to the storage position, and thereby the rod 219 is pushed further in the vehicle right direction. In this way, the pivot lever 220 is rotated by a predetermined angle in the clockwise direction, so that the moving mechanism 100 is operated in the manner similar to that of the first embodiment, and thereby the wiper arm 20 is driven to make the translational movement to the storage position P1c. When the wiper arm 20 makes the generally translational movement in the above described manner, the covers 40, 80 are continuously arranged one after another in the vehicle transverse direction T, as shown in FIG. 15.

As described above, instead of providing the two wiper motors to the two wiper arms 20, 60, respectively, the single wiper motor 200 and the link mechanism 210 can be provided to reciprocally swing the two wiper arms 20, 60.

In the third embodiment described with FIGS. 13 to 16, only the wiper arm 20 makes the translational movement at the time of making storage stop movement. Alternatively, both of the wiper arm 20 and the wiper arm 60 may be constructed to make the translational movement at the time of making the storage stop movement. In such a case, the rod 214 and the rod 219 may be directly connected to each other without providing the rise-up mechanism 224. Alternatively, besides the rise-up mechanism 224, another similar rise-up mechanism may also be provided to the wiper arm 60 side.

Fourth Embodiment

A fourth embodiment of the present invention will be described with reference to FIGS. 17A and 17B.

In the first embodiment, the wiper arm 20 and the wiper blade 30 are constructed to stop at the stop position P1c, which is below and outward of the lower turning position P1a. However, the present invention is not limited to this. With reference to FIGS. 17A and 17B, in a wiper system of the fourth embodiment, the wiper arm 20 and the wiper blade 30 are constructed to stop at a storage position P1d, which is above and outward of the upper turning position P1b. In the present instance, the wiper arm 60 and the wiper blade 70 are also constructed to stop at a stop position P2d, which is above and outward of the upper turning position P2b. These storage positions P1d, P2d are set to be generally parallel with a frame (A-pillar) 2, which supports the glass 1.

FIG. 17A shows one operational state where the wiper blades 30, 70 are placed to the upper turning positions P1b, P2b, respectively. FIG. 17B shows another operational state where the wiper blades 30, 70 are placed to the storage positions P1d, P2d, respectively.

Similar to the first embodiment, the wiper mechanism W2 of the present embodiment includes a moving mechanism 100. However, in the wiper mechanism W2 of the present instance, the stopper 105 is placed at a location where the stopper 105 limits the rotation of the fourth link 104 in the state where the wiper blade 70 is placed to the upper turning position P2b. Furthermore, in the present instance, the wiper mechanism W1 and the wiper mechanism W2 are symmetrical to each other in the transverse direction T of the vehicle.

With this construction, when the wiper motors 10 are rotated according to the corresponding drive signal received from the controller 90, the wiper blades 30, 70 are swung to the upper turning positions P1b, P2b, respectively. Thereafter, when the wiper motors 10 are further rotated by a predetermined angle from that position, the moving mechanism 100 is operated. In this way, the wiper arm 20 and the wiper blade 30 as well as the wiper arm 60 and the wiper blade 70 make the generally transverse movement to the storage positions P1d, P2d, respectively, which are generally parallel to the upper turning positions P1b, P2b, respectively, and are outward of the upper turning positions P1b, P2b, respectively, in a direction, which is generally parallel with the upper turning positions P1b, P2b.

At this time, the wiper arm 20 and the wiper blade 30 as well as the wiper arm 60 and the wiper blade 70 move a generally equal distance at a generally equal speed at its upper and lower ends, so that the wiper arm 20 and the wiper blade 30 as well as the wiper arm 60 and the wiper blade 70 make the stable translational movement. Therefore, the wiper arm 20 and the wiper blade 30 as well as the wiper arm 60 and the wiper blade 70 can be stopped along the frame. Also, at the time of the wiping movement, the wiper arm 20 and the wiper blade 30 as well as the wiper arm 60 and the wiper blade 70 can be returned at the upper turning positions P1b, P2b, respectively, which are inward of the storage positions P1d, P2d, respectively. In this way, in the present instance, it is possible to limit the interference of the wiper blades 30, 70 with the frame structure at the time of stopping movement and at the time of reciprocal wiping movement.

Fifth Embodiment

A fifth embodiment of the present invention will be described with reference to FIGS. 18A to 19B.

FIGS. 18A and 18B show a wiper system 140 according to the fifth embodiment. The wiper system 140 of the present embodiment includes two wipers 141, 151, which wipe the wiping surface 1a of the front window glass 1 of the vehicle, and is of a tandem type, in which wiping directions the wipers 141, 151 are common. The wiper 141 is provided as a driver seat side wiper, and a driver seat side pivot shaft 132, which supports this wiper 141, is provided on one side of the vehicle in the transverse direction T of the vehicle. The wiper 151 is provided as a front passenger seat side wiper, and a front passenger seat side pivot shaft 133, which supports this wiper 151, is provided generally at a center of the vehicle in the transverse direction of the vehicle. Each of the wipers 141, 151 includes a wiper arm 142, 152 and a wiper blade 143, 153. A base end of the wiper arm 142, 152 is fixed to the corresponding pivot shaft 132, 133. The wiper blade 143, 153 is connected to a distal end portion of the wiper arm 142, 152 to wipe the wiping surface 1a.

The wiper arm 142 of the driver seat side wiper 141 includes an arm head 145, a retainer 146 and an arm piece 147. The arm head 145 is slightly bent into a dogleg shape and is fixed to the pivot shaft 132 at its base end portion. The retainer 146 extends generally linearly and is rotatably connected to a distal end portion of the arm head 145 at its base end portion to permit the rotation of the retainer 146 toward and away from the wiping surface 1a in a direction generally perpendicular to the wiping surface 1a. The arm piece 147 is fixed to the retainer 146 and extends from a distal end portion of the retainer 146 to form an L-shaped body. The retainer 146 and the arm piece 147 form an arm member. The retainer 146 has a horseshoe-shaped cross section, which has its opening on a lower side thereof (a wiping surface 1a side thereof), and receives an urging spring (not shown), which urges a distal end portion of the wiper arm 142 (the arm piece 147) against the wiping surface 1a side. The wiper blade 143 is connected to a distal end portion of the arm piece 147. A wiper strip 143b (FIG. 19B), which wipers the wiping surface 1a, is held by the wiper bade 143 through holding claws 143a of a lever member, which is connected to the arm piece 147. The lever member of the wiper blade 143 is covered with a cover 143c.

The wiper arm 152 of the front passenger seat side wiper 151 includes an arm head 155, a retainer 156 and an arm piece 157. The arm head 155 extends generally linearly and is fixed to the pivot shaft 133 at its base end portion. The retainer 156 is slightly curved and is rotatably connected to a distal end portion of the arm head 155 at its base end portion to permit the rotation of the retainer 156 toward and away from the wiping surface 1a in the direction generally perpendicular to the wiping surface 1a. The arm piece 157 is fixed to the retainer 156 and extends generally linearly from a distal end portion of the retainer 156 in an extending direction of the retainer 156. The retainer 156 and the arm piece 157 form an arm member. Like the retainer 146, the retainer 156 has a horseshoe-shaped cross section, which has its opening on a lower side thereof (a wiping surface 1*a* side thereof), and receives an urging spring (not shown), which urges a distal end portion of the wiper arm 152 (the arm piece 157) against the wiping surface 1*a* side. A wiper blade 153 is connected to a distal end portion of the arm piece 157. Similar to the wiper blade 143, a wiper strip (not shown), which wipers the wiping surface 1*a*, is held by the wiper bade 153 through holding claws (not shown) of a lever member, which is connected to the arm piece 157. The lever member of the wiper blade 153 is covered with a cover 153*c*.

Through reciprocal rotation of each pivot shaft 132, 133 caused by an operation of a wiper motor (not shown), as shown in FIG. 18A, the wiper blade 143, 153 of each wiper 141, 151 is reciprocally swung within a predetermined angular range between a lower turning position K1, at which the wiper blade 143, 153 is placed to extend generally in the transverse direction of the vehicle, and an upper turning position K2, at which the wiper blade 143, 153 is placed to extend generally in a perpendicular direction that is perpendicular to the transverse direction of the vehicle. The lower turning position K1 also serves as a stop position of the wiper 141, 151 in an intermittent wiping operation of the wiper 141, 151. In a non-operational period of each wiper 141, 151, as shown in FIG. 18B, the wiper blade 143, 153 of the wiper 141, 151 is placed in a storage position K0, which is separately set at a lower part of the front window glass 1, which is below the lower turning position K1. That is, when each wiper 141, 151 is not operated, the wiper blade 143, 153 is placed in the storage position K0. Then, when each wiper 141, 151 is operated, the wiper blade 143, 153 is moved from the storage position K0 to the lower turning position K1 and is thereafter reciprocally swung between the lower turning position K1 and the upper turning position K2. Then, when the wiping operation of each wiper 141, 151 is stopped, the wiper blade 143, 153 is moved from the lower turning position K1 to the storage position K0.

When each wiper blade 143, 153 is placed in its storage position K0, the wiper arm 142 of the driver seat side wiper 141 and the wiper arm 152 of the front passenger seat side wiper 151 are held to extend generally linearly to implement the integral appearance of the wipers 141, 151. In order to implement this integral appearance, the retainer 146 of the wiper arm 142 (serving as a distal end portion of the wiper arm 142 of the invention) at the driver seat side is configured to overlap with the arm head 155 of the wiper arm 152 (serving as a base end portion of the wiper arm 152) at the front passenger seat side in a height direction (defined as a direction that is perpendicular to the wiping surface 1*a* or an axial direction of the pivot shaft 132, 133).

Specifically, as shown in FIGS. 19A and 19B, the arm head 155 at the front passenger seat side is divided into a base end side retainer placing portion 155*b* and a distal end side bulged portion 155*c* at step 155*a*, which is located at generally a longitudinal center of the arm head 155. The retainer placing portion 155*b* is located on an arm head 155 base end side of the step 155*a* and has a relatively smaller height, which is measured in the above described height direction. The distal end side bulged portion 155*c* is located on an arm head 155 distal end side of the step 155*a* and has a relatively larger height, which is measured in the above described height direction and is higher than that of the retainer placing portion 155*b*. At the storage position K0, a distal end side cover portion 146*a* of the driver seat side retainer 146 is placed on a top side of the retainer placing portion 155*b* of the arm head 155, and a top surface 146*b* of the retainer 146 is generally flush with a top surface 155*d* of the distal end side bulged portion 155*c*. Therefore, in this state, the portion of the driver seat side wiper arm 142 and the portion of the front passenger seat side wiper arm 152 are overlapped with each other to form an overlapped section. Furthermore, the top surface 155*d* of the distal end side bulged portion 155*c* of the arm head 155 is also generally flush with a top surface 156*a* of the front passenger seat side retainer 156.

In this way, when viewed from a top side in the direction (the axial direction of the pivot shaft 132, 133), which is generally perpendicular to the wiping surface 1*a*, the driver seat side wiper arm 142 and the front passenger seat side wiper arm 152 appeared to be extending continuously to implement the integral appearance of the wipers 141, 151. Also, when viewed from a lateral side of the wiper arms 142, 152, the wiper arms 142, 152 appeared to be extending continuously to implement the integral appearance of the wipers 141, 151. When the driver seat side wiper arm 142 and the front passenger seat side wiper arm 152 overlap with each other, the driver seat side wiper blade 143 is placed adjacent to and extends generally in parallel with the overlapped section between the wiper arms 142, 152 on a lateral side (a wiping movement start direction side) of the overlapped section.

At the storage position K0 (stop position), an axial distal end surface 146*c* of the retainer 146 and a stepped surface 155*e* (an axial end surface of the step 155*a*) of the arm head 155 are opposed to each other and are generally in parallel with each other in the overlapped section. Furthermore, the distal end surface 146*c* of the retainer 146 and the stepped surface 155*e* of the arm head 155 form an undercut shape and an uppercut shape, respectively, in a wiping movement start direction of the wipers 141, 151 (a direction from the storage position K0 to the lower turning position K1 in FIG. 18B) and extend generally linearly in an oblique direction, which is angled relative to the longitudinal direction of the wiper arms 142, 152. In this way, when the wipers 141, 151 are moved from its lower turning position K1 to the storage position K0 (stop position) or are moved from its storage position K0 (stop position) to the lower turning position K1, interferences between the retainer 146 and the arm head 155 at the overlapped section are advantageously limited, and a gap S between the opposed surfaces 146*b*, 155*e* can be advantageously minimized to improve the appearance of the wiper system 140.

Next, the advantages of the fifth embodiment will be described.

(1) In the wiper system 140 of the present embodiment, when each wiper blade 143, 153 is placed its storage position K0, the distal end side (the distal end side cover portion 146*a* of the retainer 146) of the wiper arm 142 of the driver seat side wiper 141 and the base end side (the retainer placing portion 155*b* of the arm head 155) of the wiper arm 152 of the front passenger seat side wiper 151 are overlapped with each other in the height direction to form the overlapped section, which provides the longitudinally continuous outer appearance between the wiper arms 142, 152. In this way, the driver seat side wiper 141 and the front passenger seat side wiper 151 can provide the integral appearance rather than providing separate independent appearances, so that the nonintegrated impression of the wipers 141, 151 can be reduced, and thereby the presence of the wipers 141, 151 on the vehicle becomes less conspicuous to improve the appearance of the vehicle.

(2) According to the present embodiment, the distal end side of the driver seat side wiper arm 142 overlaps over the base end side of the front passenger seat side wiper arm 152 to form the overlapped section. Specifically, the base end side of each wiper arm 142, 152 is fixed to the pivot shaft 132, 133 of the vehicle. Thus, when the base end side of the front passenger seat side wiper arm 152, which form the overlapped section, is placed under the distal end side of the driver seat side wiper arm 142, interferences between the front passenger seat side pivot shaft 133 and the driver seat side wiper arm 142 can be advantageously limited while the overlapped section is made in a simple form.

(3) According to the present embodiment, the distal end side of the driver seat side wiper arm 142 overlaps over the arm head 155 of the front passenger seat side wiper arm 152 to form the overlapped section. Specifically, the arm head 155 of the wiper arm 152 is fixed to the pivot shaft 133, and the retainer 156 of the wiper arm 152 is rotatable relative to the arm head 155 toward and away from the wiping surface 1a in the direction generally perpendicular to the wiping surface 1a. Thus, when the overlapped section is formed with the arm head 155, which does not rotate toward and away from the wiping surface 1a in the direction generally perpendicular to the wiping surface 1a, the gap between the distal end side of the driver seat side wiper arm 142 and the arm head 155 of the front passenger seat side wiper arm 152 in the height direction can be minimized.

(4) According to the present embodiment, the top surface 146b of the retainer 146 of the driver seat side wiper arm 142, the top surface 155d of the distal end side bulged portion 155c of the front passenger seat side arm head 155 and the top surface 156a of the retainer 156 are generally flush with each other in the overlapped section. In this way, the wipers 141, 151 provide the integral appearance without a substantial step therebetween to improve the appearance of the vehicle.

(5) According to the present embodiment, the distal end surface 146c of the driver seat side retainer 146 and the stepped surface 155e of the front passenger seat side arm head 155 are opposed to each other in such a way that the distal end surface 146c and the stepped surface 155e form the undercut shape and the uppercut shape, respectively, in the wiping movement start direction of the wipers 141, 151 and extend generally linearly in the oblique direction, which is angled relative to the longitudinal direction of the wiper arms 142, 152. In this way, the distal end surface 146c of the retainer 146 and the stepped surface 155e of the arm head 155 will not interfere with each other, and the gap S between the distal end surface 146c and the stepped surface 155e can be minimized to improve the appearance.

(6) According to the present embodiment, the driver seat side wiper blade 143 is placed on the wiping movement start direction side of the driver seat side wiper arm 142. Thus, even in the state where the driver seat side wiper arm 142 and the front passenger seat side wiper arm 152 are held in the storage position K0, at which the integral appearance of the wipers 141, 151 is implemented, the wiping start movement of the driver seat side wiper blade 143 will not be interfered.

(7) The wipers 141, 151 of the present embodiment are constructed to have the overlapped section when the wipers 141, 151 are placed in its storage position K0, which is provided separately from the lower turning position K1. That is, the wipers 141, 151 tend to have a positional deviation in the reciprocal wiping movement thereof. Thus, with the above construction, it is possible to limit collision between the wipers 141, 151 at the overlapped section during the wiping movement thereof.

The fifth embodiment may be modified as follows.

In the fifth embodiment, the distal end side of the driver seat side wiper arm 142 overlaps over the base end side of the front passenger seat side wiper arm 152. This may be reversed such that the base end side of the front passenger seat side wiper arm 152 overlaps over the distal end side of the driver seat side wiper arm 142.

In the fifth embodiment, the distal end side portion of the driver seat side wiper arm 142 overlaps over the arm head 155 of the wiper arm 152 to have the overlapped section. However, the construction of the overlapped section is not limited to this. For example, the distal end side portion of the driver seat side wiper arm 142 may overlap over the arm head 155 and the retainer 156 of the front passenger seat side wiper arm 152.

In the fifth embodiment, the top surface 146b of the retainer 146 of the driver seat side wiper arm 142, the top surface 155d of the distal end side bulged portion 155c of the front passenger seat side arm head 155, and the top surface 156a of the retainer 156 are generally flush with each other. However, the portions to be flushed with each other are not limited to these portions. Further alternatively, these portions may not be flushed with each other, if desired.

In the fifth embodiment, the distal end surface 146c of the driver seat side retainer 146 and the stepped surface 155e of the arm head 155, which are opposed to each other, extend generally linearly in the oblique direction, which is angled relative to the longitudinal direction of the wiper arms 142, 152. Alternatively, the distal end surface 146c and the stepped surface 155e may extend non-linearly in the oblique direction. For example, the distal end surface 146c and the stepped surface 155e may be curved or bent. Furthermore, these opposed surfaces 146c, 155e may not extend in the oblique direction, which is angled relative to the longitudinal direction of the wiper arms 142, 152. For example, the opposed surfaces 146c, 155e may extend in a direction perpendicular to the longitudinal direction of the wiper arms 142, 152.

In the fifth embodiment, the driver seat side wiper blade 143 is placed on the lateral side of the overlapped section between the wiper arms 142, 152. Alternatively, the driver seat side wiper blade 143 may be included in the overlapped section.

In the fifth embodiment, the overlapped section is formed when the wipers 141, 151 are placed in its storage position K0. However, in a case of a wiper system, which does not have the storage position K0, the overlapped section may be formed at the lower turning position.

In the fifth embodiment, the arm piece 147, 157 is formed separately from the retainer 146, 156 and is thereafter fixed to the retainer 146, 156 to form the arm member. Alternatively, the retainer and the arm piece may be integrally formed to implement the arm member.

Additional advantages and modifications will readily occur to those skilled in the art. The invention in its broader terms is therefore not limited to the specific details, representative apparatus, and illustrative examples shown and described.

What is claimed is:

1. A wiper system comprising:
   first and second wiper arms; and
   first and second wiper blades that are connected to the first and second wiper arms, respectively, to wipe a wiping surface, wherein the first wiper arm includes a cover portion, which at least partially covers at least one of the second wiper arm and the second wiper blade to continuously arrange the first and the second wiper arms one after the other along a lower edge of the wiping surface when each of the first and second wiper blades is placed in a corresponding stop position thereof, wherein the first and second wiper arms are respectively swung from the stop position of the corresponding wiper blade in a common direction, the cover portion of the first wiper arm forms a distal end portion of the first wiper arm, which is overlapped with a base end portion of the second wiper arm in a height direction of the cover portion of the first wiper arm to form an overlapped section when each of the first and second wiper blades is placed in the corresponding stop position, the overlapped section is configured such that a top surface of the first wiper arm is generally flush with a top surface of the second wiper arm in the overlapped section when each of the first and second wiper blades is placed in the corresponding stop position, the first and second wiper arms have opposed surfaces, respectively, which are opposed to each other in the longitudinal direction and are tilted relative to the longitudinal direction of each of the first and second wiper arms when each of the first and second wiper blades is placed in the corresponding stop position, the opposed surface of the first wiper arm has an undercut shape, which is undercut in a wiping movement start direction of each of the first and second wiper arms, and the opposed surface of the second wiper arm has an uppercut shape, which is uppercut in the wiping movement start direction of each of the first and second wiper arms.

2. The wiper system according to claim 1, wherein:
the first wiper arm includes:
an arm head that is fixed to a first pivot shaft; and
an arm member that is rotatably connected to the arm head of the first wiper arm and includes the cover portion of the first wiper arm;
the second wiper arm includes:
an arm head that is fixed to a second pivot shaft; and
an arm member that is rotatably connected to the arm head of the second wiper arm; and
the arm member of the first wiper arm is overlapped with the arm head of the second wiper arm to form the overlapped section.

3. The wiper system according to claim 1, wherein the first wiper blade is placed on a wiping movement start direction side of the first wiper arm generally in parallel with the first wiper arm at the stop position of the first wiper blade.

4. The wiper system according to claim 1, wherein:
the stop position of each of the first and second wiper blades is a storage position of the wiper blade, which is set separately from a lower swing movement turning position of the wiper blade; and
the first wiper arm is overlapped with the second wiper arm at the overlapped section when each of the first and second wiper blades is placed in the corresponding storage position.

\* \* \* \* \*